(12) United States Patent
Meadows

(10) Patent No.: US 9,643,092 B2
(45) Date of Patent: May 9, 2017

(54) APPARATUS AND METHOD FOR SIMULATED GAMEPLAY BASED ON A GEOSPATIAL POSITION

(71) Applicant: SKYHAWKE TECHNOLOGIES, LLC., Ridgeland, MS (US)

(72) Inventor: James W. Meadows, Madison, MS (US)

(73) Assignee: SKYHAWKE TECHNOLOGIES, LLC., Ridgeland, MS (US)

( * ) Notice: Subject to any disclaimer, the term of this patent is extended or adjusted under 35 U.S.C. 154(b) by 308 days.

(21) Appl. No.: 14/218,325

(22) Filed: Mar. 18, 2014

(65) Prior Publication Data

US 2014/0274240 A1 Sep. 18, 2014

Related U.S. Application Data

(60) Provisional application No. 61/798,098, filed on Mar. 15, 2013.

(51) Int. Cl.
  *A63B 57/00* (2015.01)
  *A63F 13/812* (2014.01)
  (Continued)

(52) U.S. Cl.
  CPC .......... *A63F 13/812* (2014.09); *A63F 13/216* (2014.09); *A63F 13/92* (2014.09)

(58) Field of Classification Search
  CPC .... A63B 2069/3605; A63B 2071/0691; A63B 69/3676
  See application file for complete search history.

(56) References Cited

U.S. PATENT DOCUMENTS

| 4,142,236 A | 2/1979 | Martz et al. |
| 4,266,214 A | 5/1981 | Peters, Jr. |

(Continued)

FOREIGN PATENT DOCUMENTS

| GB | 2249202 | 4/1992 |
| JP | 5-49724 | 3/1993 |

(Continued)

OTHER PUBLICATIONS

Jack Nicklaus' Greatest 18 Holes of Major Championship Golf, Players Guide for Commodore 64/128 version by: Ken Moore, (24 pp.)(1988).

(Continued)

*Primary Examiner* — Reginald Renwick
(74) *Attorney, Agent, or Firm* — Oblon, McClelland, Maier & Neustadt, L.L.P.

(57) ABSTRACT

A device includes circuitry configured to receive, from a position sensor, a geospatial position of the device. The circuitry is configured to receive, from a memory, image data corresponding to one or more golf courses, wherein the image data is received when the circuitry determines that the geospatial position of the device corresponds to a current golf course, of the at least one golf courses. The circuitry is configured to control a display such that the image data corresponding to the current golf course is output on the display. The circuitry is configured to receive a simulated shot input representing a simulated golf stroke taken at the geospatial location of the device. The circuitry is configured to calculate a simulated shot trajectory based on the simulated shot input. The circuitry is configured to control the display to output a result of the simulated golf stroke.

18 Claims, 30 Drawing Sheets

(51) Int. Cl.
*A63F 13/216* (2014.01)
*A63F 13/92* (2014.01)

(56) References Cited

U.S. PATENT DOCUMENTS

| | | | |
|---|---|---|---|
| 4,367,526 | A | 1/1983 | McGeary et al. |
| 4,815,020 | A | 3/1989 | Cormier |
| 4,879,648 | A | 11/1989 | Cochran et al. |
| 5,294,110 | A | 3/1994 | Jenkins et al. |
| 5,319,548 | A | 6/1994 | Germain |
| 5,426,422 | A | 6/1995 | Vanden Heuvel et al. |
| 8,109,816 | B1 | 2/2012 | Grober |
| 8,142,304 | B2 * | 3/2012 | Reeves ............ A63B 71/0669 473/190 |
| 2002/0060642 | A1 * | 5/2002 | Togasaka ............ A63B 71/06 342/357.25 |
| 2003/0207718 | A1 | 11/2003 | Perlmutter |
| 2005/0101415 | A1 * | 5/2005 | Sweeney ............ A63B 24/0021 473/407 |
| 2005/0227791 | A1 * | 10/2005 | McCreary ........... A63B 69/3658 473/407 |
| 2005/0282650 | A1 | 12/2005 | Miettinen et al. |
| 2009/0017944 | A1 | 1/2009 | Savarese et al. |
| 2009/0209358 | A1 | 8/2009 | Niegowski |
| 2010/0130298 | A1 * | 5/2010 | Dugan ............. A63B 69/3623 473/223 |
| 2010/0306825 | A1 | 12/2010 | Spivack |
| 2011/0190078 | A1 | 8/2011 | Heckendorf, III et al. |
| 2011/0224025 | A1 | 9/2011 | Balardeta et al. |
| 2011/0230986 | A1 | 9/2011 | Lafortune et al. |
| 2011/0301927 | A1 | 12/2011 | Ok |
| 2012/0035003 | A1 | 2/2012 | Moran et al. |
| 2012/0050529 | A1 | 3/2012 | Bentley |
| 2012/0077627 | A1 * | 3/2012 | Denton ................ A63B 57/00 473/407 |
| 2012/0115626 | A1 | 5/2012 | Davenport |
| 2012/0142443 | A1 | 6/2012 | Savarese et al. |
| 2013/0079170 | A1 | 3/2013 | Balardeta et al. |
| 2013/0095940 | A1 | 4/2013 | Dugan |
| 2013/0203518 | A1 | 8/2013 | Hatton et al. |
| 2014/0094942 | A1 | 4/2014 | Tarde et al. |
| 2014/0213382 | A1 | 7/2014 | Kang et al. |

FOREIGN PATENT DOCUMENTS

| | | |
|---|---|---|
| WO | 92/04080 | 3/1992 |
| WO | 94/04982 | 3/1994 |

OTHER PUBLICATIONS

Game Boy, Nintendo, Ultra Golf (23 pp.)(1992).
Turbo Tax User Manual Version 10.0 ChipSoft (98 pp.)(1992).
Sony Video Cassette Recorder Operating Instructions 1990 (60 pp.).
Scoremaster 1981 by Eagle Scoremaster, Inc. (32 pp.).
PGA Tour Golf Instruction Booklet Licensed by Nintendo (21 pp.)(1991).
How to Play Jack Nicklaus' Greatest 18 Holes of Major Championship Golf, Konami, Licensed by Nintendo (11 pp.)(1989).
International Search Report and Written Opinion issued on Aug. 20, 2014 in PCT/US2014/030988.

* cited by examiner

APPARATUS AND METHOD FOR SIMULATED GAMEPLAY BASED ON A GEOSPATIAL POSITION

BACKGROUND

Description of Related Art

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly nor impliedly admitted as prior art against the present disclosure.

Recent devices allow users to play games via a user interface. For example, a mobile device such as a smartphone may include processing circuitry for executing a game application corresponding to a simulated golf round. In this case, the user may interact with the interface by manipulating operational keys and/or a touch screen in order to play the game.

Additionally, devices are available for displaying accurate representations of a golf course. These devices may include geospatial positioning sensors, such as a Global Positioning System (GPS) unit, for determining a present location of the device. Based on the geospatial position determination, an indication of the device's current position may be overlain on a display illustrating golf course/hole features. Accordingly, a user in possession of the GPS unit can observe a visual representation of their current position on a golf hole. The geospatial position may also be utilized to determine quantitative aspects of the golf course and/or a round of golf. For example, geospatial positioning inputs may be utilized to determine a current distance to the hole, distance to green, etc.

SUMMARY

In one embodiment according to the present disclosure, a device includes circuitry configured to receive, from a position sensor, a geospatial position of the device. The circuitry is configured to receive, from a memory, image data corresponding to at least one golf courses, wherein the image data is received when the circuitry determines that the geospatial position of the device corresponds to one of the at least one golf courses. The circuitry is configured to control a display such that the image data for the golf course is output on the display. The circuitry is configured to receive a simulated shot input representing a simulated golf stroke taken at the geospatial location of the device. The circuitry is configured to calculate a simulated shot trajectory based on the simulated shot input. The circuitry is configured to control the display to output a result of the simulated shot.

The foregoing general description of the illustrative embodiments and the following detailed description thereof are merely exemplary aspects of the teachings of this disclosure, and are not restrictive.

The details of one or more implementations are set forth in the accompanying drawings and description below. Other features, objects, and advantages will be apparent from the description and drawings, and from the claims.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
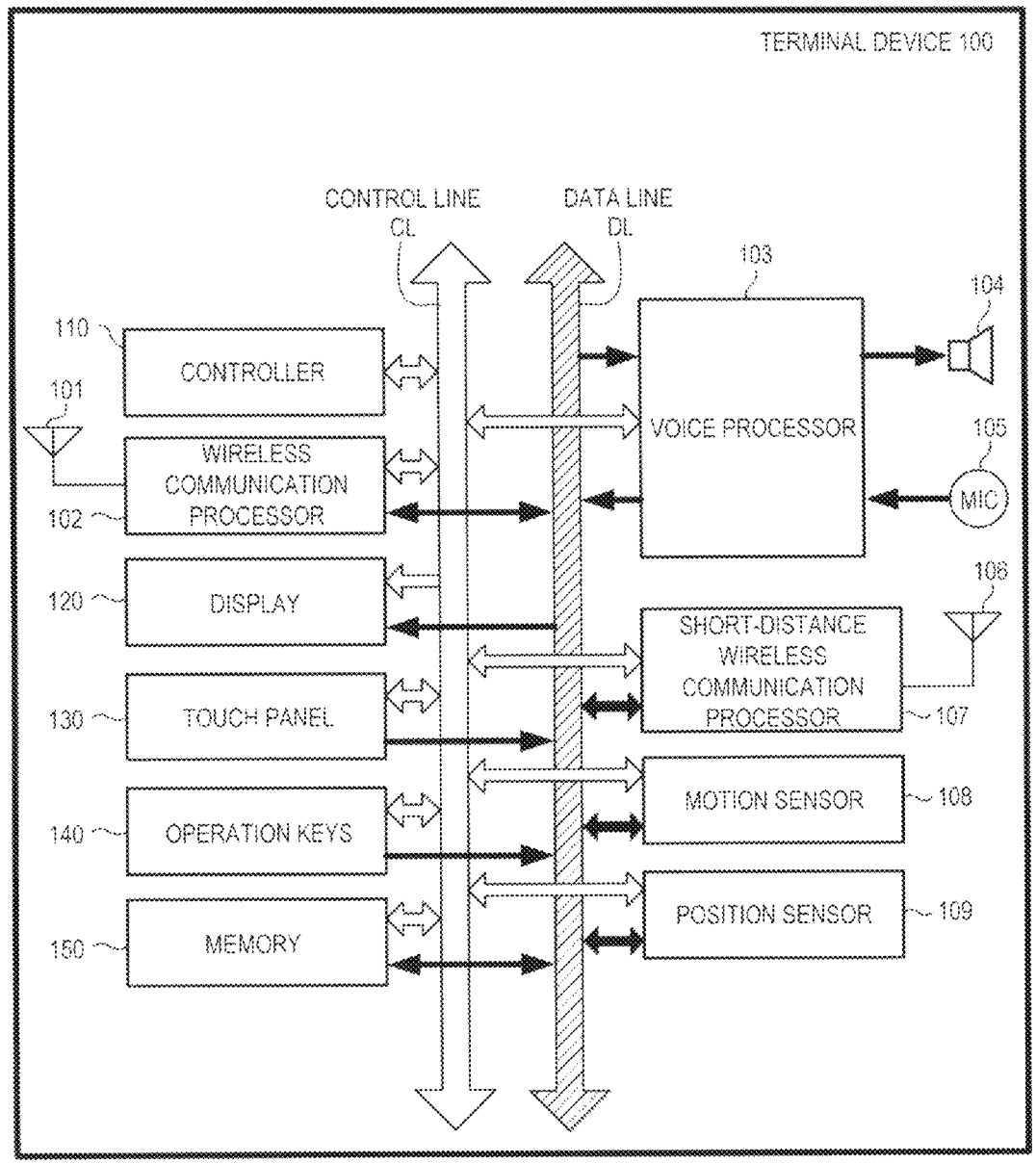
FIG. 1 illustrates a block diagram of an exemplary terminal device for implementing processing described herein, according to certain embodiments.

GPS-based golf systems may display where a user is located on a golf hole, distances to green, etc. Additionally, accurate maps of golf courses combined with accurate GPS positioning may allow a user to visualize their current positions on the course. Scores may also be tracked and/or calculated automatically using various sensor inputs (e.g., accelerometers, gyroscopes, inertial measurement units, compass, GPS movements, time at a position, light sensors, audio sensors, piezo sensors, etc.).

Golf simulation systems that utilize actual or simulated (e.g., computer generated) images of real golf courses may also allow a user to simulate a round of golf on a PC for demonstrations. However, computer-based simulations of golf fail to provide the experience of actually being outdoors and on the course, which golfers tend to crave. Among other things, the present disclosure describes combining aspects of golf simulations and GPS-based golf systems would to a user to play golf in the real world using partial simulation and partial reality.

The benefits of such a virtual to reality golf system include enabling a user to go outside and "play" a round of golf even when, e.g., the user has limitations in swinging a club, or cannot swing a club at all. For example, a shoulder injury may prevent a user from hitting a driver off the tee, but the user would still like to join a round of golf with his or her friends. In this case, the user could simulate all drives using the virtual golf simulation, and incorporate actual shots that the user is able to hit (e.g., chips and putts) into the virtual golf simulation. As another example, children that are not strong or skilled enough to play a regulation round of golf can still participate with their parents on the course by simulating portions of the child's round, thereby improving speed of gameplay and the enjoyment of all parties involved. As another example, a device according to the present disclosure may allow a user to focus on specific aspects of his or her game while foregoing actual shots on areas that are not important to the user (e.g., just focusing on your short game, or even just taking a putter and focusing on putts, while at the same time still feeling the full experience of a round of golf).

In all of the above examples, a hybrid score that combines both real and simulated shots may be calculated, which further enhances the user's experience of participating in a simulated or partially simulated round of golf that takes place on a real golf course. This is great, e.g, for learning fairway strategy without getting frustrated with really bad tee and fairway shots. It helps you focus on improving specific portions of the game (layups, putting, etc.). It also provide a means to play on a real course when your physical condition limits your ability to hit certain shots either due to temporary health issues, injury or simply age. Children (and others) can play virtually alongside their parents or better players who are hitting real shots, and get a feel of the game and a sense of competing, even though they cannot really hit a real ball as well, but perhaps can putt competitively.

Aspects of the present disclosure allow users to still experience the social, mental, and physical benefits of playing golf, but provides a system that adapts to the user's physical constraints or particular desires. Golf courses may also offer discounted rates for users that wish to participate in a virtual to reality round of golf, which could increase revenues since these users may otherwise not pay to participate.

As a non-limiting example, a user can go to a golf course equipped with a GPS-based mobile device. Exemplary mobile devices include the SkyCaddie by SkyGolf, or a smartphone equipped with the SkyCaddie app. The user may carry a limited set of clubs based on their limitations, needs, or desires for the round. For simplicity, this example assumes the user wishes only to putt. At the tee, the user "marks" their ball based on the current GPS position. A virtual club is chosen based on the user's plan for playing the shot. The user performs a virtual action of "hitting" the ball on the mobile device. For example, a "swipe" action can be performed on a touch screen. Aspects of physical golf play may be incorporated into the simulation (e.g., features of the simulated swing input dictating direction, power, accuracy, etc. of swing, and real or simulated wind, club selection/type, course condition, etc.). In certain aspects of the present disclosure, the user could actually move the mobile device in a swinging motion to simulate the actual swing, similar to the Wii by Nintendo®. Processing circuitry, which may include one or more computer processing units, can calculate the trajectory of the simulated swing and display where the ball "landed" on the mobile device display. The user can then proceed to that location, evaluate the conditions at the location (e.g., lie, distance, pin placement, etc.), choose another virtual club, and repeat the above-described shot simulation. When the shot lands on the green, the user can then use a real putter to complete the hole. The hole can then be scored based on the combined results of the simulated shots and the actual putts. The user then advances to the next hole and the process repeats.

Referring now to the drawings, wherein like reference numerals designate identical or corresponding parts throughout the several views.

FIG. 1 illustrates a block diagram of an exemplary terminal device for implementing processing described herein, according to certain embodiments. For simplicity, the terminal device 100 illustrated in FIG. 1 is implemented on a smartphone. However, the skilled artisan will appreciate that the processing described herein may be easily adapted for other types of devices such as a portable or cart-mounted golfing device (e.g., SkyCaddie by) SkyGolf®, a tablet device, a laptop computer, a server, an e-reader device, a portable gaming device, a navigation unit, etc.

Referring now to FIG. 1, the exemplary terminal device 100 of FIG. 1 includes a wireless communication processor 102 connected to an antenna 101, a voice processor 103, a speaker 104, a microphone 105, a short-distance wireless communication processor 107 connected to an antenna 106, a motion sensor 108, a position sensor 109, a controller 110, an environmental sensor 115, a display 120, a touch panel 130, operation keys 140, and a memory 150.

The terminal device 100 also includes a control line CL and a data line DL as internal communication bus lines. Control data to/from the controller 110 may be transmitted through the control line CL. The data line DL may be used for transmission of voice data, display data, etc.

The antenna 101 transmits/receives electromagnetic wave signals between base stations for performing radio-based communication, such as the various forms of cellular telephone communication. The electromagnetic wave signals may be modulated to include various data, such as geospatial position data received from a GPS satellite and/or other data transmitted on a radio-based network.

The wireless communication processor 102 controls communications performed between the terminal device 100 and other external devices via the antenna 101. For example, the wireless communication processor 102 may control communication between base stations for cellular telephone communication.

The voice processor 103 demodulates and/or decodes the audio data read from the memory 150, or audio data received by the wireless communication processor 102 and/or short-distance wireless communication processor 107. Additionally, the voice processor 103 may decode audio signals received from the microphone 105.

The speaker 104 emits an audio signal corresponding to audio data supplied from the voice processor 103.

The microphone 105 detects surrounding audio, and converts the detected audio into an audio signal. The audio signal may then be output to the voice processor 103 and/or the controller 110 for further processing.

The antenna 106 may transmit/receive electromagnetic wave signals to/from other external apparatuses, and the short-distance wireless communication processor 107 may control the wireless communication performed with the other external apparatuses. Bluetooth, IEEE 802.11, and near field communication (NFC) are non-limiting examples of wireless communication protocols that may be used for inter-device communication via the short-distance wireless communication processor 107.

The motion sensor 108 may include one or more motion sensors capable of determining various aspects of motion with respect to the terminal device 100. For example, the sensor 108 may include circuitry for one or more gyroscopes, accelerometers, inertial measurement units, compasses, or the like.

The position sensor 109 may include one or more sensors capable of receiving and/or determining a geospatial position of the terminal device 100. In certain embodiments, the position sensor 109 is a GPS-type radiolocation receiver.

The controller 110 may include one or more Central Processing Units (CPUs), and may control each element in the terminal device 100 to perform features related to a communication control, audio signal processing, control for the audio signal processing, image processing and control, and other kinds signal processing. The controller 110 may perform these features by executing instructions stored in the memory 150. Alternatively or in addition to the local storage of the memory 150, the features may be executed using instructions stored on an external device (e.g., a server) accessed on a network, or on a non-transitory computer readable medium.

The environmental sensor 115 may include one or more sensors that detect and/or receive inputs indicating environmental conditions. For example, the environmental sensor 115 may include sensors that detect conditions of rain, wind, temperature, humidity, etc. In certain embodiments, the environmental sensor 115 may receive indications of the environmental conditions from an external device, such as a server. In other embodiments, the environmental conditions may be determined with direct measurements relative to the terminal device 100. Environmental condition data may, in certain embodiments, be utilized by the controller 110 when computing aspects of a simulated shot trajectory. For example, the environmental sensor 115 may directly measure wind conditions relative to the terminal device 100. The controller 110 may apply the measured wind conditions to the processing for computing a simulated shot trajectory such that the real-world wind conditions impact the result of the simulated shot. Incorporating real-world environmental conditions for processing related to simulated golf strokes adds realism to the simulation, and also results in the simulated score results being better assimilated with real-world results of actual shots (i.e., the hybrid score that is calculated using a combination of actual shots and simulated shots are representative of shots taken in the same weather conditions, which is desirable for golfers seeking maximum realism in the golf simulations).

The display 120 may be a liquid crystal display (LCD), an organic electroluminescence display panel, or another display screen technology. In addition to displaying still and moving image data, the display 120 may display operational inputs, such as numbers or icons, which may be used for control of the terminal device 100. The display 120 may additionally display a graphical user interface with which a user may control aspects of the terminal device 100. Further, the display 120 may display characters and images received by the terminal device 100 and/or stored in the memory 150 or accessed from an external device on a network. For example, the terminal device 100 may access a network such as the Internet and display text and/or images transmitted from a Web server.

The touch panel 130 may include a physical touch panel display screen and a touch panel driver. The touch panel 130 may include one or more touch sensors for detecting an input operation on an operating surface of the touch panel display screen. Used herein, the phrasing "touch operation" refers to an input operation performed by touching an operating surface of the touch panel display with an instruction object, such as a finger or stylus-type instrument. In the case where a stylus, or the like, is used in a touch operation, the stylus may include a conductive material at least at the tip of the stylus such that the sensors included in the touch panel 130 may detect when the stylus approaches/contacts the operating surface of the touch panel display (similar to the case in which a finger is used for the touch operation).

In one or more embodiments, the touch panel 130 may be disposed adjacent to the display 120 (e.g., laminated), or may be formed integrally with the display 120. The display 120 and the touch panel 130 may be surrounded by a protective casing, which may also enclose the other elements included in the terminal device 100. For simplicity, exemplary embodiments described herein assume that the touch panel 130 is formed integrally with the display 120 and therefore, the examples may describe touch operations being performed with respect to the display 120.

In one or more embodiments, the touch panel 130 is a capacitance-type touch panel technology. In other embodiments, the touch panel 130 may be implemented using other touch panel types with alternative structures, such as resistance-type touch panels. In certain embodiments, the touch panel 130 may include transparent electrode touch sensors arranged in the x/y direction on the surface of transparent sensor glass.

The touch panel driver may be included in the touch panel 130 for control processing related to the touch panel 130, such as scanning control. For example, the touch panel driver may scan each sensor in an electrostatic capacitance transparent electrode pattern in the x-direction and the y-direction, and detect the electrostatic capacitance value of each sensor to determine when a touch operation is performed. The touch panel driver may output a coordinate and corresponding electrostatic capacitance value for each sensor. The touch panel driver may also output a sensor identifier that may be mapped to a coordinate on the touch panel display screen. Additionally, the touch panel driver and touch panel sensors may detect when an instruction object is within a predetermined distance from the operating surface of the touch panel display screen. That is, an electrostatic capacitance above a given background level may be detected when an instruction object is near, but not necessarily touching, the operating surface of the touch panel 130. Accordingly, the controller 110 may determine that a touch operation has occurred in response to detecting an electrostatic capacitance above a predetermined threshold, wherein the threshold magnitude corresponds to a condition when the instruction object is within a predetermined distance from the operating surface of the touch panel.

The operation keys 140 may include one or more buttons similar to external control elements (e.g., power control, volume control, standby control, etc.). The operation key 140 may generate an operation signal based on a detected input. The operation signals generated by the operation key 140 may be supplied to the controller 110 for performing related processing control of the terminal device 100. In certain aspects of the present disclosure, the processing and/or functions associated with external buttons and the like may be performed by the controller 110 in response to an input operation on the touch panel 130 in lieu of implementing the terminal device with external buttons in the operation key 140.

The memory 150 may include, e.g., Read Only Memory (ROM), Random Access Memory (RAM), or a memory array comprised of a combination of volatile and non-volatile memory units. The memory 150 may be utilized as working memory by the controller 110 while executing the processing and algorithms of the present disclosure. Additionally, the memory 150 may be used for long-term storage, e.g., of images and information related thereto.

Figure 2:
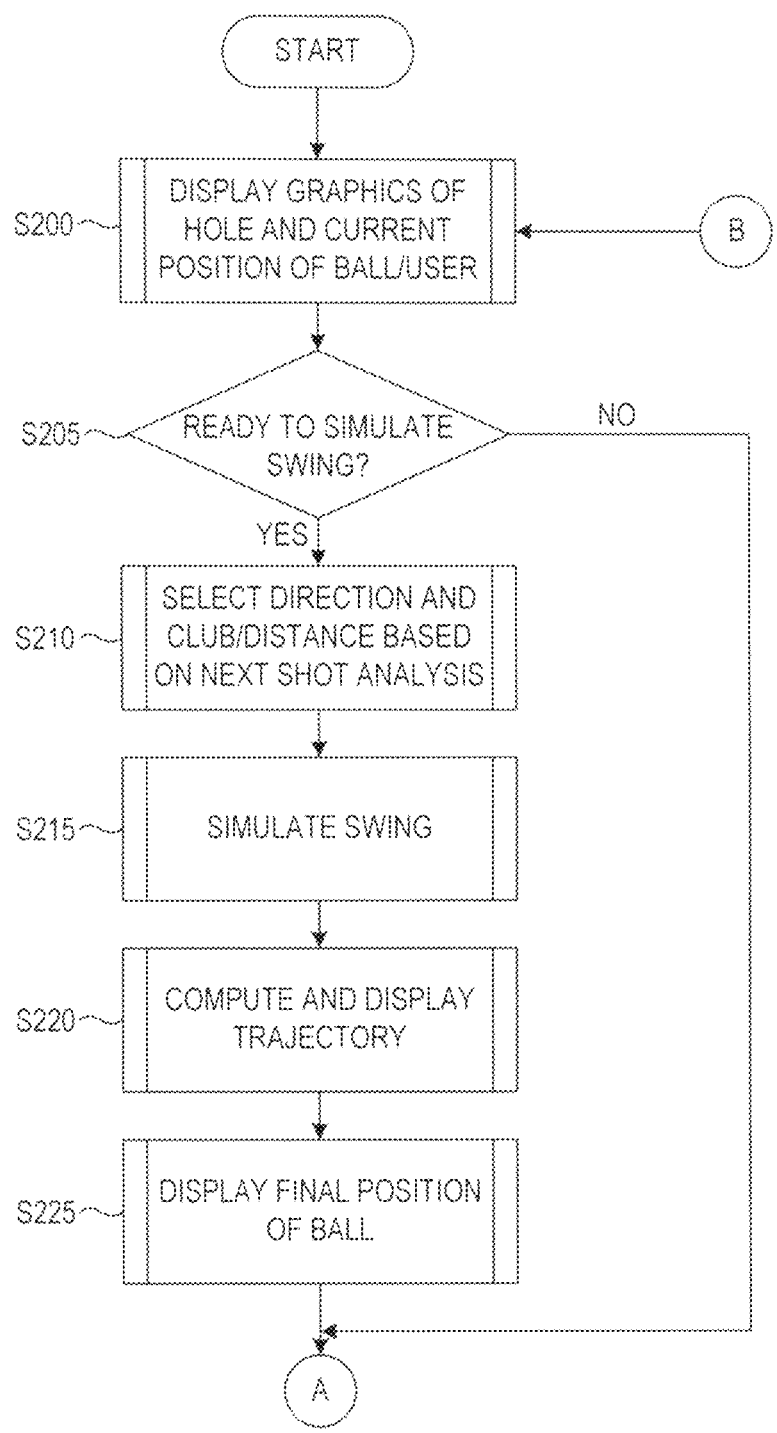
FIGS. 2 and 3 illustrate exemplary flowcharts related to virtual-to-reality golf processing, according to certain embodiments.
Figure 3:
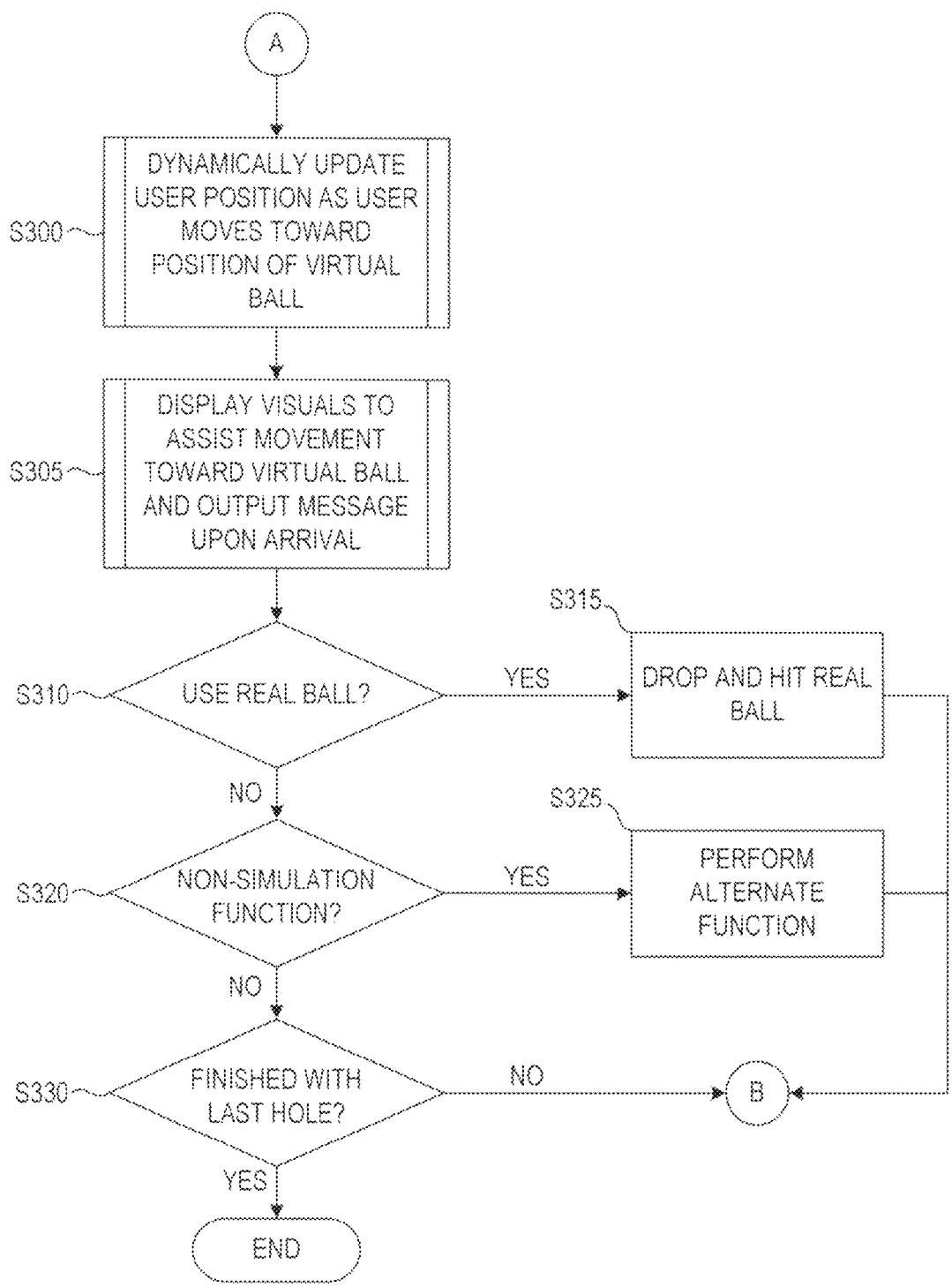

Next, FIGS. 2 and 3 illustrate exemplary flowcharts related to virtual-to-reality golf processing, according to certain embodiments.

Referring first to FIG. 2, the process of FIG. 2 begins at step S200 where the controller 110 controls the display 120 such that a display interface is shown on the display. The display interface in certain embodiments may include graphics representing a golf hole corresponding to a current position of a golf ball and/or a user. For example, the controller 110 may determine a current geospatial location of the golfer based on an input from the position sensor 109. The controller 110 may then correlate the geospatial position of the user with golf course data stored in the memory 150. For example, the controller 110 may determine that the geospatial position data received from the position sensor 109 corresponds to a particular golf course, of which corresponding course data is stored in the memory 150. Once the course on which the user is currently playing is determined, the controller 110 may, in certain embodiments, determine the hole of golf course on which the user is currently positioned. As a result of determining the hole on which the user is currently playing, the controller 110 may control the display 120 such that the interface includes graphical representations of the hole such that the user viewing the device on the current hole has a visual representation of the hole not only on the terminal device 100, but also a real-life view of the actual course. Further exemplary processing related to the processing at step S200 will be discussed later in greater detail at least with respect to FIG. 4.

At step S205, the controller 110 determines whether the user of the terminal device 100 is ready to simulate a golf swing. As discussed previously, there may be a case in which a golfer wishes to simulate some or all of their swings while actually physically participating in a round of golf on an actual golf course. For example, the user may be physically unable to perform certain aspects of a round of golf, in which case the user may choose to simulate all drives from the tee box and use actual swing data for all approach shots and putts. Accordingly, the display 120 may include an interface in which the user is able to enter an input indicating that a current swing will be simulated. It is noted here that the terms "virtual" and "simulated" are used interchangeably herein to describe aspects of golf shots performed with the terminal device 100.

In response to receiving the input indicating that a current swing will be simulated, the controller 110 moves to step S210. Otherwise, if the controller 110 receives an input indicating that a current swing will not be simulated, the process of FIG. 2 proceeds to step S300, which is discussed later with respect to FIG. 3.

At step S210, when the user has indicated that the next shot will be a simulated golf shot, the user analyzes the next shot using a combination of the data displayed on the display 120, as well as real data visible to the golfer while standing on the golf course. At step S210, the user may enter information indicating a direction and/or a club to be used for the next shot. Further, the golfer may also select a distance at which the next simulated shot should travel in an ideal scenario (i.e., a target position). In certain embodiments, the distance of the simulated next shot will be based on the club selection. In certain embodiments, the interface displayed on the display 120 may also include input sections on which a user may indicate a type of trajectory the user wishes the simulated next shot to take. For example, the user may input information indicating that the next simulated shot will be a fade or draw. Additional detailed processing related to the processing performed at step S210 will be discussed in greater detail later at least with respect to FIG. 5.

At step S215, the user simulates a golf swing using the terminal device 100. As will be discussed later in greater detail, there are numerous ways in which a user may simulate a golf swing using the terminal device 100. In general, the user may simulate a golf swing using the terminal device 100 by performing a physical action with respect to the terminal device 100 and/or by performing a direct input into an interface included on the display 120. As a non-limiting example of performing a physical action to simulate a golf swing using the terminal device 100, the user may perform a swinging motion while holding the terminal device 100, and the motion sensor 108 may capture motion data related to the swinging motion performed by the user. The motion data captured when the user swings the terminal device 100 may then be analyzed by the controller 110, and features with respect to the simulated swing may be determined by the controller 110. Non-limiting examples of swing data that may be determined based on inputs received from the motion sensor 108 may include information related to the golfer's swing plane, swing speed, swing tempo, face angle, lie angle, club loft, etc. In certain embodiments, the controller 110 may control the display 120 such that a graphical recreation of the user's swing is output on the display 120 in response to the analysis results from the received motion data from the motion sensor 108. In another non-limiting exemplary embodiment, the user may perform a simulated golf swing by directly inputting information into the interface displayed on the display 120. In this case, the user may perform a simulated swing similar to the case in which the user would typically perform a golf swing on a video game application being executed on the terminal device 100. The aforementioned exemplary embodiments for performing a simulated golf swing using the terminal device 100 are merely examples presented herein for illustration purposes and should not be construed as limiting. Further examples of processing related to simulating a golf swing using the terminal device 100 will be discussed later in greater detail at least with respect to FIGS. 6 through 9.

At step S220, the controller 110 computes and displays a trajectory of the simulated golf shot performed at step S215. As discussed previously, the controller 110 may receive swing data from the motion sensor 108 in response to detected motion when the user performs a physical act of swinging the terminal device 100 (or other inputs corresponding to a simulated shot). Based on an analysis of the motion data (or other simulated shot data) received by the controller 110, the controller 110 may compute a simulated shot trajectory at step S220. In certain embodiments, the controller 110 may determine a deviation from an ideal trajectory based on the input received at step S210. For example, based on data from the accelerometer included in the motion sensor 108 and the gyroscope included in motion sensor 108, the controller 110 may determine a deviation from an ideal distance and shot path from the ideal distance and shot path determined at step S210. That is, when entering information such as a club selection and shot direction at step S210, the controller 110 may determine default distances and shot trajectories based on an ideal scenario using the club and the selected shot path under ideal conditions. In this case, the controller 110 may utilize the motion data received at step S215 to determine whether the received motion data is consistent with the ideal shot data determined at step S210. Alternatively, the controller 110 at step S220 may simply derive the shot trajectory information directly at step S220 without any comparison or other processing with respect to an ideal swing scenario.

Adjustments of shot trajectory based on the location at which the shot occurs (i.e., in the rough, sand, etc.) or inputs corresponding to current course conditions (e.g., an input received from a clubhouse server indicating the course is wet and/or otherwise is playing faster or slower than normal) may be utilized when computing the simulated shot trajectory. Further, the computation of the shot trajectory may be based on an input indicating a manufacturer of the simulated club. For example, the user may input information into the terminal device 100 indicating the manufacturer and type of clubs the user actually uses when performing real shots (i.e., the clubs in the user's golf bag that are being used in calculating a hybrid score). The controller 110 may then account for the manufacturer of the clubs when computing features of the simulated swing.

Moreover, the controller 110 may apply historical log data corresponding to how a user typically hits a particular club. For example, the controller 110 could receive data from a server onto which the user has downloaded previous round information that includes the results of each shot and which club was hit for that shot.

Additional detail processing performed with respect to determining a simulated shot trajectory will be discussed later in greater detail at least with respect to FIG. 10.

At step S225, the controller 110 determines the final position of the simulated ball based on the computed shot trajectory information from step S220. The controller 110 may then control the display 120 such that the final position of the simulated ball is displayed at step S225. The displayed final simulated position of the ball provides a visual representation on the display 120 that the golfer can then utilize in order to determine a position of the simulated ball with respect to the current position of the user. For example, the display 120 may include an interface indicating a current position of the user based on geospatial position data received from the position sensor 109, as well as the position of the simulated ball following the simulated shot. Accordingly, because the user is operating the device on an actual golf course, the simulated position of the ball may be correlated to an actual geospatial location on the golf course that a user may then proceed to in order to perform a subsequent real or simulated golf shot at the new position. As will be discussed later, the controller 110 may control a display 120 such that the interface outputs information guiding the user to the actual geospatial location corresponding to the displayed position of the simulated ball. Further exemplary processing related to the processing performed at step S225 will be discussed later in greater detail at least with respect to FIG. 11.

Referring now to FIG. 3, at step S300, the controller 110 controls the display 120 such that the interface displayed on the display 120 dynamically updates the user's current position as the user moves toward the position of the virtual ball. This example assumes that the user has performed a simulated swing in previous steps and the position of the final landing position of the simulated shot is displayed on the display 120. Accordingly, based on the data displayed on the interface, the user can use the displayed map and displayed positions of the user and the simulated ball as a guide for moving on the actual course toward the position of the simulated ball. The user's current location on the course may be determined at a predetermined frequency using information from the position sensor 109. The geospatial position data received from the position sensor 109 may be translated into display coordinates of the user on the golf course map, and the displayed device position may be updated according to the predetermined frequency. Processing related to the processing described for step S300 will be discussed later in greater detail at least with respect to FIG. 12.

At step S305, the controller 110 controls the display 120 such that the interface displayed on the display 120 includes visuals to assist the user's movement toward the virtual ball position. The visuals for assisting movement toward the virtual ball position may include an output indicating a distance and/or a direction to the virtual ball position, whereby the distance and direction corresponds to an actual distance and direction that the user must walk in order to arrive at the virtual ball location. In certain embodiments, the displayed interface may include messages or other indications when the user is within a predetermined distance of the virtual ball location. That is, because the virtual ball location is obviously not actually visible to the user as he or she walks toward that position on the actual golf course, the display 120 may output messages to the user so that the user understands when he or she is within a predetermined distance (e.g. within 5 yards), of the virtual position of the simulated shot. Additional processing related to the processing of step S305 will be discussed later in greater detail at least with respect to FIG. 13.

At step S310, the present example assumes that the user has arrived to an actual geospatial location corresponding to the final landing position of the simulated shot performed in the previous steps. For example, the user has used the output of the display 120 as a guide for arriving at an actual physical location on the golf course corresponding to the final landing position of the simulated shot. When the user arrives at this location on the actual golf course, the user may then determine whether he or she wishes the next shot to be an actual shot using a real ball or another simulated shot performed using the terminal device 100. If the user determines at step S310 that he or she wishes to hit the next shot using a real ball, the user at step S315 drops a real ball and hits the next shot with an actual golf club. Scoring data related to the actual shot performed at step S315 may be entered manually or alternatively may be captured automatically using sensors, for example, included in the golf club and/or data related to the motion of the terminal device 100. Exemplary processing for performing automatic deemed ball strike determinations and related automatic golf scoring are discussed in detail at least in U.S. application Ser. No. 13/843,380, which is incorporated herein by reference.

If the user determines at step S310 that he or she wishes to perform another simulated golf shot, the process of FIG. 3 proceeds to step S320. Scoring for the current round may also be updated to include information for the previous simulated shot at this point.

At step S320, the controller 110 determines whether a non-simulation function will be applied. For example, the user may wish to neither hit a real nor a simulated golf shot at step S320 because he or she wishes to only focus on certain aspects of the golf round. In this case, the controller 110 may perform another function, such as switching to the next hole such that the user may perform real or simulated golf shots for the continuation of the golf round. In such a case, the controller 110 at step S325 may perform an alternate function, which may include controlling the display 120 to update the displayed interface to include course map information corresponding to the next hole in the golf round. The non-simulation function may also generally correspond to input operations performed on the terminal device 100 that are not related to simulating golf shots.

At step S330, if the controller 110 determines at step S320 that a non-simulated function will not be applied, the controller 110 determines whether the user is finished with the last hole in the golf round. For example, assuming the user has entered information indicating that he or she will be participating in an 18-hole round of golf, the controller 110 may utilize geospatial position information from the position sensor 109 to determine that the user is presently on hole 18 and that the user has completed play on this hole. As a result, the controller 110 may compile the scores from the previous holes and determine a total round score for the user. As discussed previously, the total round score may be a hybrid score incorporating both actual golf shots as well as simulated golf shots performed with the terminal device 100. Such a hybrid score provides the benefit of allowing the user to physically partake in a round of golf on an actual course while substituting simulated shots for actual shots when the user is, for example, physically unable or otherwise does not desire to perform an actual golf shot.

If the controller 110 determines at step S330 that the user has not completed the current round of golf, the processing returns to step S200. Otherwise, the processing of FIG. 3 ends.

Figure 4:
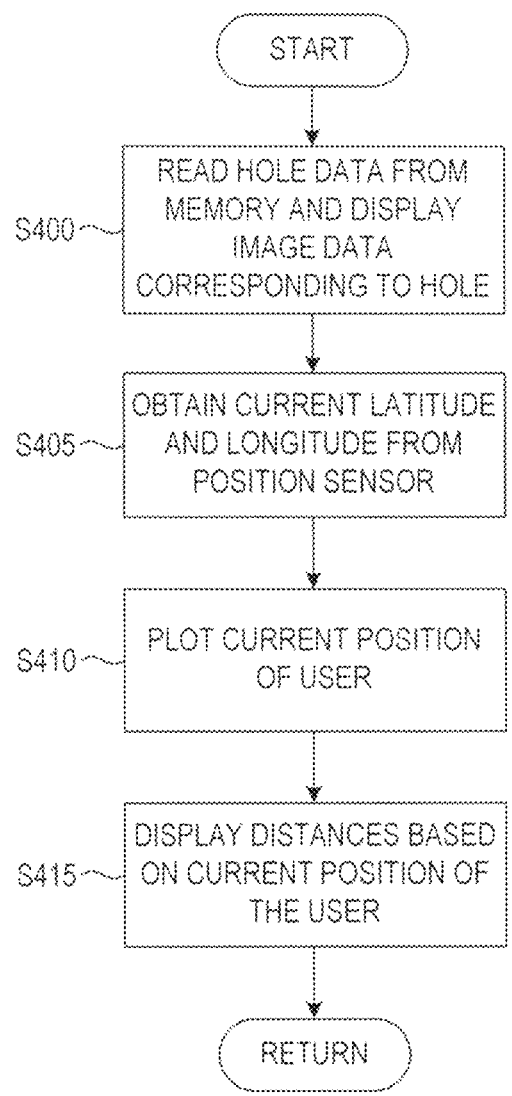
FIG. 4 illustrates an exemplary flowchart corresponding to processing for controlling a display interface when a golfer moves to a simulated or real ball position on a golf course, according to certain embodiments.

Next, FIG. 4 illustrates an exemplary flowchart corresponding to processing for controlling a display interface when a golfer moves to a simulated or real ball position on an actual golf course, according to certain embodiments. In certain embodiments, the processing illustrated and discussed with respect to FIG. 4 may be performed at step S200 of FIG. 2.

Referring to FIG. 4, the controller 110 at step S400 reads hole data from the memory 150 and displays image data corresponding to the current hole. For example, the controller 110 may determine a golf course on which the user is currently located based on a geospatial position input received from a position sensor 109. The controller 110 may use the geospatial position data corresponding to the current location of the terminal device 100 and determine that the geospatial position is included within a range of geospatial positions corresponding to a golf course map stored in the memory 150. In certain embodiments, the controller 110 may utilize the geospatial position data of the terminal device 100 to determine a current hole that the user is playing. For example, based on the retrieved course data, the controller 110 may determine that the geospatial position data indicating the current location of the terminal device 100 corresponds to a range of geospatial positions included in a hole of the current golf course map. In response to determining the current hole on which the golfer is located, the controller 110 may control the display 120 to dynamically update the displayed interface including the golf course map such that a portion of the map corresponding to the current hole is displayed within the interface.

At step S405, the controller 110 obtains the current latitude and longitude position of the terminal device 100 from the position sensor 109 and translates the geospatial position of the terminal device 100 to a corresponding display position. For example, the controller 110 may translate the latitude and longitude coordinates into XY coordinates corresponding to display positions on the display 120.

At step S410, the controller 110 controls the display 120 such that the current position of the user (i.e. the current position of the terminal device 100 when in possession of the user) is displayed on the displayed golf course map. For example, the controller 110 may control the display 120 such that the interface includes an icon overlaid on the map corresponding to the current course hole. Accordingly, a user viewing the display 120 has a visual representation of the user's current location on the hole.

At step S415, the controller 110 may calculate information related to the user's current position on the hole based on the current position of the user determined at step S405. For example, the controller 110 may apply mathematical functions to determine the distance from the user's current position to an objective on the current hole. Exemplary objectives may include the green, the pin, or another arbitrary location such as a location corresponding to a cursor position on the display 120 interface. In certain embodiments, the mathematical functions used for determining relative position data with respect to the user's current position and an objective on the current hole may involve applying geometric relationships based on inputs corresponding to the display coordinates of the user's current position and the objective. For example, the controller 110 may receive as inputs the coordinate positions of the displayed objective and the user's current position and calculate a straight-line distance separating the two coordinates, as well as other information such as a relative direction of the objective with respect to the user.

Figure 14:
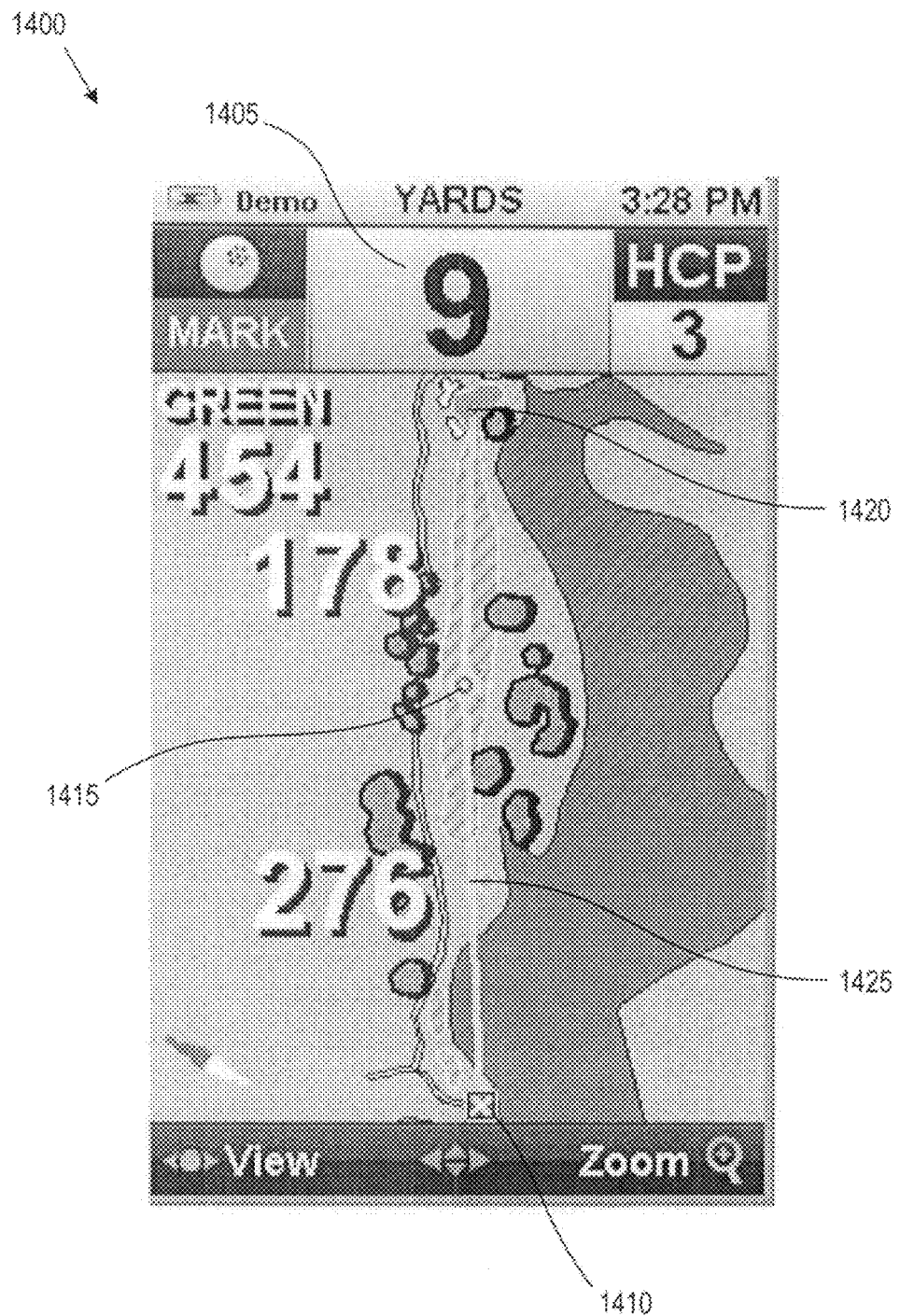
FIGS. 14-30 illustrate various exemplary display interface states related to simulated golf swings and/or a combination of simulated and real swings during a round of golf, according to certain embodiments.

FIG. 14 illustrates a non-limiting exemplary display interface that may be generated as a result of the processing performed in FIG. 4. Referring to FIG. 14, an exemplary display interface 1400 includes, among other things, a current hole indication 1405, a current position icon 1410, a cursor icon 1415, an objective icon 1420, and a shot trajectory 1425. As discussed above with respect to FIG. 4, the controller 110 may receive geospatial information from the position sensor 109 and determine a user's current position on a golf course and determine the current hole on which the user is playing. In the example of FIG. 14, retrieved geospatial position data from the position sensor 109 indicates that the golfer is at a geospatial position corresponding to the ninth hole of the golf course. Accordingly, the controller 110 controls the display 120 such that course data corresponding to hole #9 is output on the display 120. An indication of the hole number is displayed at the top of the interface 1400 using the current hole indication 1405.

The current position of the user is displayed on the interface 1400 as icon 1410. Further, the position of an objective on the current hole is displayed as icon 1420. By default, the objective of the hole may be the pin or the green; however, other objectives may be applied, and such objectives may be set in a settings function. Additionally, the interface 1400 may include a movable cursor represented by icon 1415. In certain embodiments, the user may interact with the interface 1400 such that the display position of the icon 1415 moves, and information relative to the display position of the icon 1415 may be also displayed in the interface 1400. The position of the cursor icon 1415 may also be set as the objective for the hole or for the next shot.

In certain embodiments, the user may alter the current view of the display interface 1400 by, for example, zooming or panning the display using the touch panel 130 and/or operation keys 140. Accordingly, the display interface 1400 provides a dynamically changeable view corresponding to the current hole such that the user may have a perspective view of the golf course map, as well as an actual view of the golf course when utilizing the terminal device 100.

As discussed above for FIG. 4, the controller 110 may determine relative position information with respect to the user's current position and the position of a course objective and/or another arbitrary position. In the example of FIG. 14, the controller 110 may utilize coordinate positions of the user's current position icon 1410 and the objective icon 1420 to determine a total distance between the two icons. Moreover, the controller 110 may determine, in a similar fashion, a distance between the current position icon 1410 and the cursor icon 1415. The distances between the respective icons may be output on the display interface 1400. In the example of FIG. 14, the distance between icons 1410 and 1415 is 276 yards, and the distance between cursor icon 1415 and objective icon 1420 is 178 yards, which results in a total distance of 454 yards assuming the user shot path corresponds to the trajectory 1425.

The interface 1400 also provides information indicating the direction of the various shots that may be taken for the current hole. By utilizing the data provided in the display interface 1400, in addition to the real-world data provided by the user who is actually present on the golf course, the user can analyze his or her next shot and determine whether a simulated or actual shot will be taken. Additionally, in both cases of taking an actual or a simulated shot, the user may utilize the information included in the display interface 1400 to plan for the next shot (e.g., make club selections, select targets, etc.).

Figure 5:
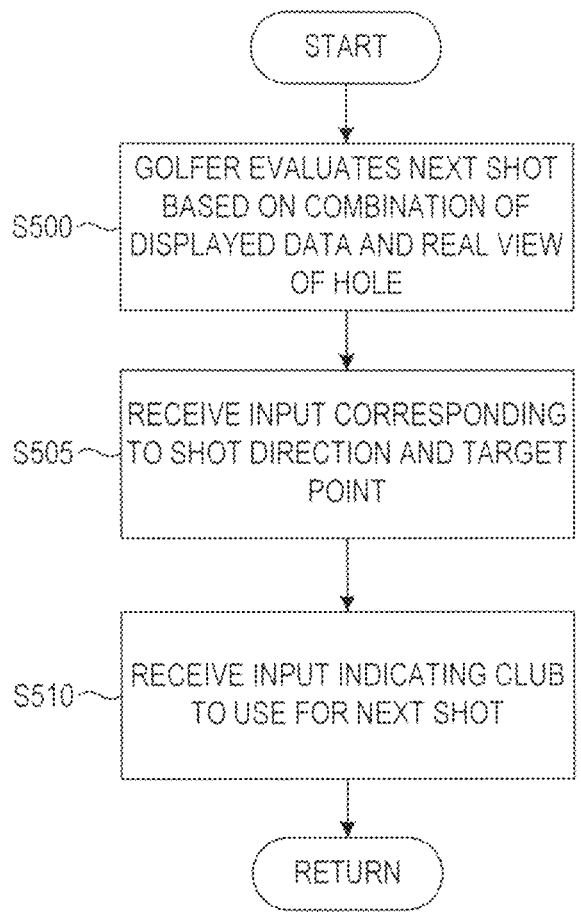
FIGS. 5 and 6 illustrate exemplary flowcharts corresponding to processing for controlling a display interface when a simulated golf shot will be performed, according to certain embodiments.
Figure 6:
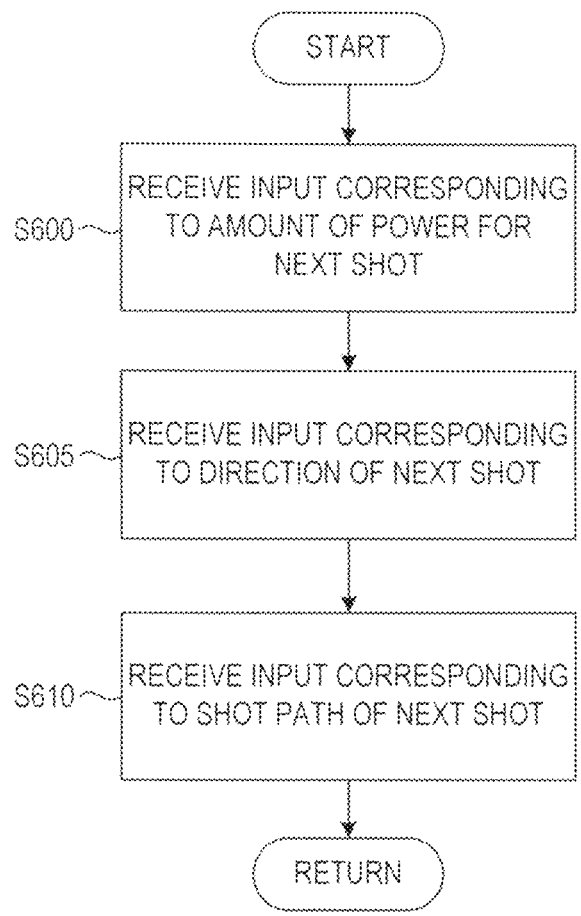

Next, FIGS. 5 and 6 illustrate exemplary flowcharts corresponding to processing for controlling a display interface when a simulated golf shot will be performed, according to certain embodiments.

Referring first to FIG. 5, in certain embodiments the processing of FIG. 5 may be performed at step S210 of FIG. 2.

At step S500, the golfer utilizing the terminal device 100 evaluates his or her next shot based on a combination of the displayed data on the display 120 and real-world viewing data of the hole from the golfer's physical perspective on the hole. Using this combination of data, the golfer may determine how he or she wishes to play the next shot. For example, the user may determine how far and in which direction the shot should be hit for strategic purposes, as well as which club should be used to hit the desired shot.

At step S505, assuming the user wishes to utilize a simulated shot for the next shot, the user performs an input operation indicating a target location on the displayed hole on which the user wishes to hit the next simulated shot. In certain embodiments, the user may indicate a target location by performing a touch operation on the touch panel 130, whereby the controller 110 may correlate the detected position of the touch operation with the target position at which the user wishes to hit the next simulated shot. The target position may then be displayed as a cursor icon on the display interface, and relative position information with respect to the user's current position, such as the distance between the user's current position and the target position, may be displayed on the interface.

At step S510, the user performs an input operation on the display interface to indicate which club he or she wishes to utilize in the next simulated shot. In response to receiving the indication of the club utilized for the next shot, the controller 110 may retrieve information corresponding to the club from the memory 150. For example, the memory 150 may store information corresponding to the user's clubs such as the typical distance and loft that would result from a shot hit with the user's selected club. As discussed previously, the information corresponding to the user's clubs may be based on one or more of manufacturer data corresponding to the clubs and historical log data corresponding to shots the user has taken with the clubs. The controller 110 may control the display 120 such that the display interface outputs information indicating the performance information for the selected club such that the user may determine whether the selected club is appropriate for hitting the next shot at the target position indicated at step S505. For example, the user may determine whether the typical maximum distance of the selected club is greater than or less than the desired distance between the user's current location and the indicated target position.

Figure 15:
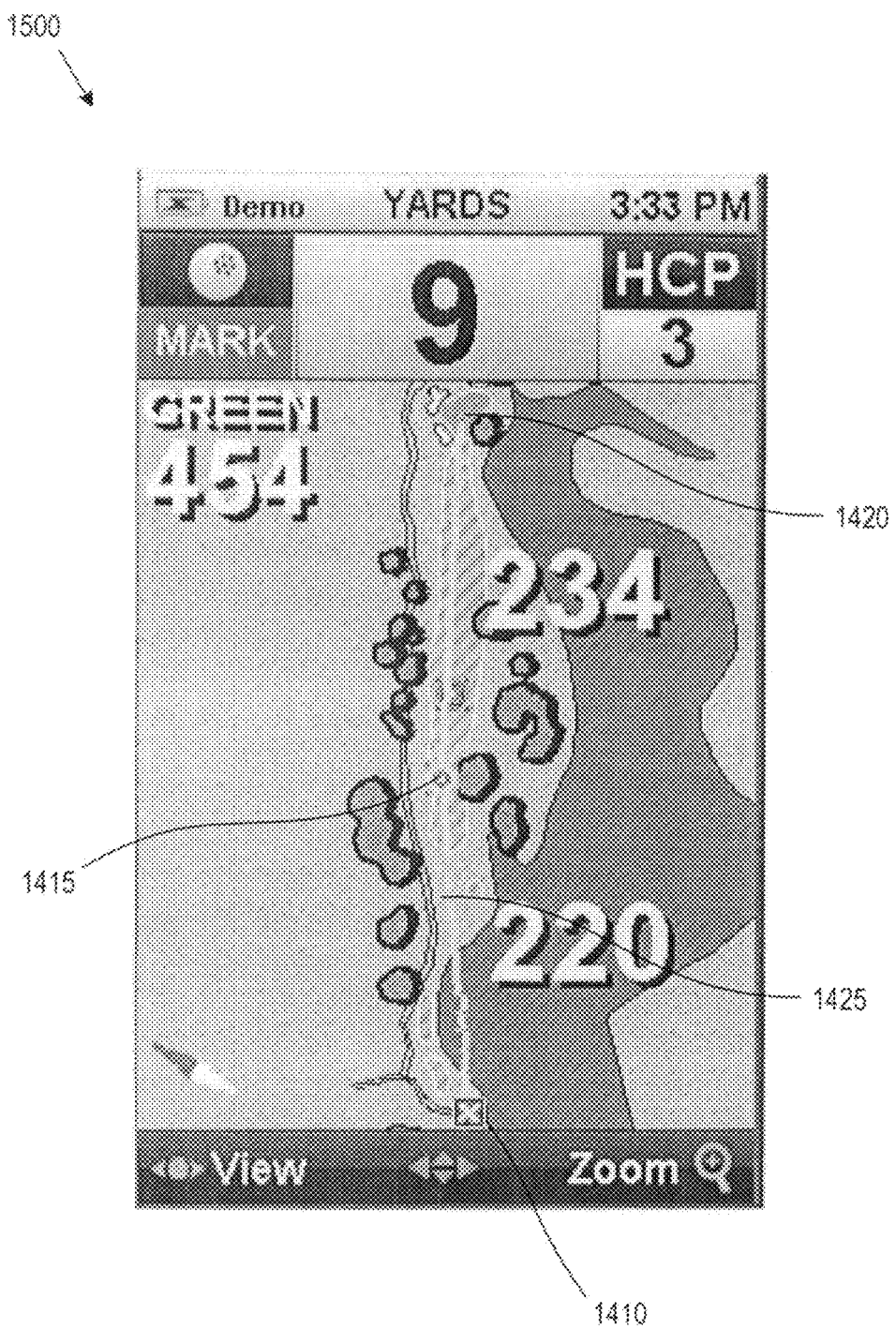
Figure 16:
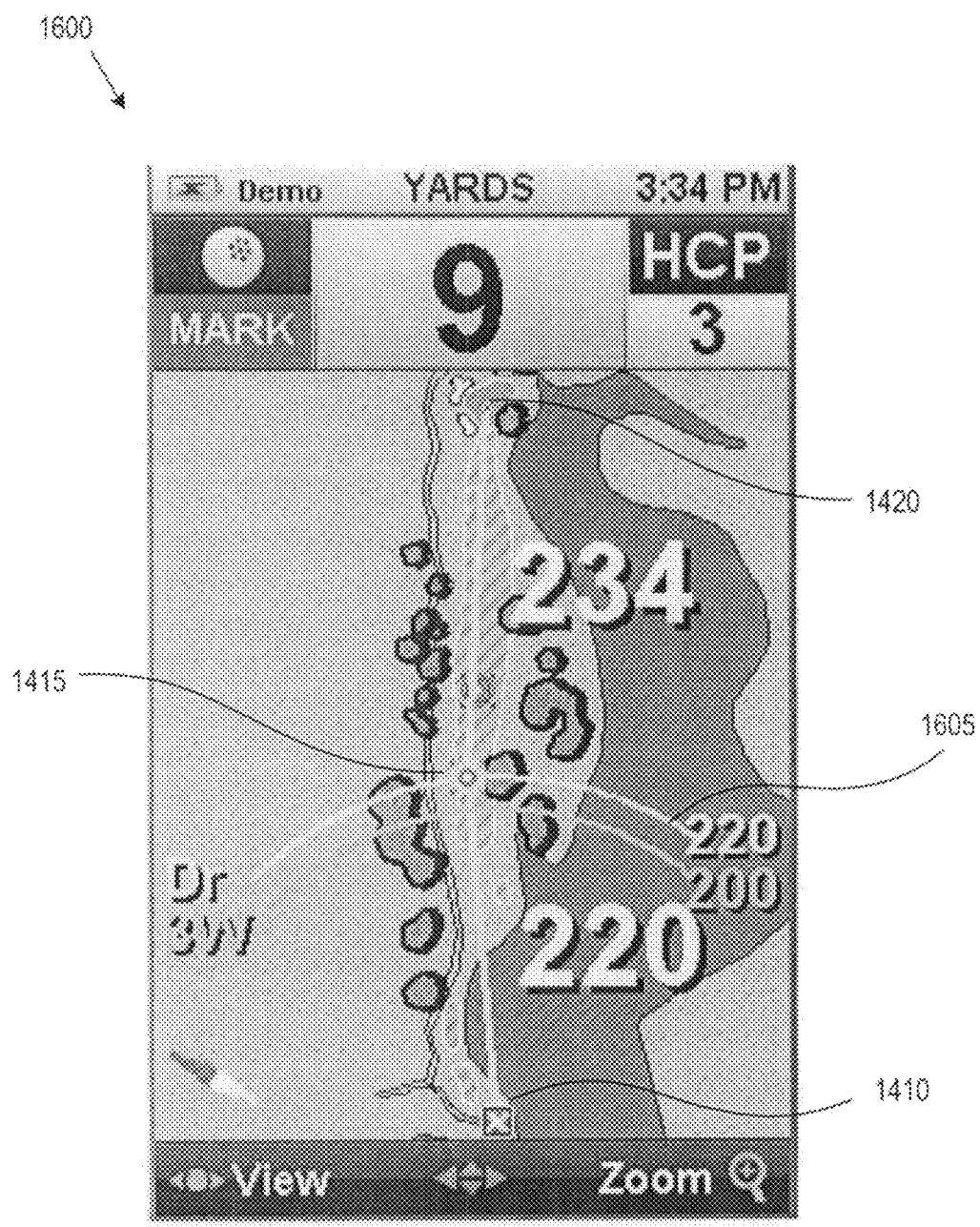
Figure 17:

FIGS. 15 through 17 illustrate exemplary display interfaces that may be output as a result of processing performed from FIG. 5.

Referring first to FIG. 15, FIG. 15 illustrates an exemplary display interface 1500. The exemplary display interface 1500 may correspond to a display interface output at step S505 of FIG. 5. As mentioned previously, the user may perform input operations with respect to the touch panel 130 (or operation keys 140) to indicate a target position for the next simulated shot. In the example of display interface 1500, the user may perform a touch operation at a display position corresponding to the cursor icon 1415. In response to detecting the touch operation, the controller 110 may control the display 120 such that the interface 1500 outputs the display coordinate of the icon 1415 at the position corresponding to the detected touch operation. The controller 110 may also calculate relative distance and direction information corresponding to the position of the icon 1415 with respect to current position icon 1410, and display this information within the display interface 1500. For example, the controller 110 may determine that the distance between the user's current location represented by icon 1410 and the target location represented by icon 1415 is 220 yards. Accordingly, the user may make decisions with respect to the club used for the next shot. Further, by viewing the hole information displayed on the interface 1500, the user may also ascertain various hazards that may be in play between the current location and the target position of the shot. For example, the user may determine that a water hazard, a sand hazard, or other arbitrary course element may come into play for the next shot, and this information may also be incorporated into the decision for club selection.

Referring now to FIG. 16, FIG. 16 illustrates an exemplary display interface 1600, which may be output in response to processing performed at step S510 in certain embodiments. The exemplary interface 1600 includes multiple indications of club performance features that the user may utilize when making a club selection decision. Specifically, the interface 1600 includes two indications of expected distance (range rings 1605) if the next simulated shot were to be hit with a driver or a 3-wood. Using the information output on the interface 1600, the user may then determine which of the clubs is appropriate based on the desired position indicated by the target location of the next shot. In the example of FIG. 16, the user may visually determine that the driver provides the user the best probability of hitting the simulated shot to the desired target position (icon 1415).

Referring now to FIG. 17, FIG. 17 illustrates another exemplary interface 1700 which may be output on the display 120 for making a club selection at step S510 in FIG. 5. The exemplary interface 1700 includes a menu area 1705 in which the user may perform input operations by scrolling through a plurality of possible clubs for the simulated shots, and for inputting an indication of the selected club to be utilized for the simulated shot. Based on the received indication of the selected club, the controller 110 may determine information corresponding to the club with respect to the next shot. For example, the controller 110 may use the input indicating the club selection as part of the calculation for determining how far the virtual ball is likely to travel during the simulated shot. Further, in later calculations of the actual simulated shot trajectory, the user may utilize the expected performance information related to the selected club when determining the actual travel of the simulated shot. For example, based on the information indicating the selected club, the controller 110 may determine a typical distance at which a simulated ball would travel assuming the shot is performed at full power. Accordingly, if the simulated swing input indicates that the user wishes to perform the simulated shot at less than full power, the user may calculate the trajectory of the simulated ball as a percentage of the full power typical distance corresponding to the club. As discussed previously, the expected performance information may correspond to manufacturer data related to the clubs and historical log data corresponding to results of previous shots hit with the clubs.

Next, FIGS. 6-9 illustrate exemplary flowcharts corresponding to processing for simulating a golf shot, according to certain embodiments. The exemplary processing illustrated in FIGS. 6-9 may, in certain embodiments, correspond to the processing performed at step S215 in FIG. 2.

Referring first to FIG. 6, FIG. 6 illustrates an exemplary method for performing a simulated shot by directly inputting shot information into a display interface output on the display 120.

At step S600, the controller 110 receives an input corresponding to an amount of power to be applied to the next shot. Non-limiting exemplary inputs that may be utilized for indicating an amount of power to be applied to the next shot may include an input operation indicating how far back a back swing of the simulated shot goes, how fast the swing occurs, an amount of follow through, etc.

At step S605, the controller 110 receives an input corresponding to a direction of the next simulated shot. Non-limiting exemplary inputs that may correspond to, or be utilized for, determining a direction of the simulated shot may include a touch operation indicating a timing at which the simulated ball strike occurs with respect to an ideal timing, a direction of a touch operation (e.g. a direction of a swipe operation), etc.

At step S610, the controller 110 receives an input corresponding to a shot path of the next simulated shot. In this example, the "shot path" corresponds to the determination as to whether the simulated shot is a draw, fade, hook, slice, straight, etc. Non-limiting exemplary inputs that may be utilized for determining a shot path of the simulated shot may include a manual input (e.g. a button indicating a draw or fade for the shot) a direction of a touch operation (e.g. a direction of a swipe operation), etc.

FIGS. 18 through 21 provide exemplary illustrative display interface outputs that may be displayed during the processing of FIG. 6.

Figure 18:
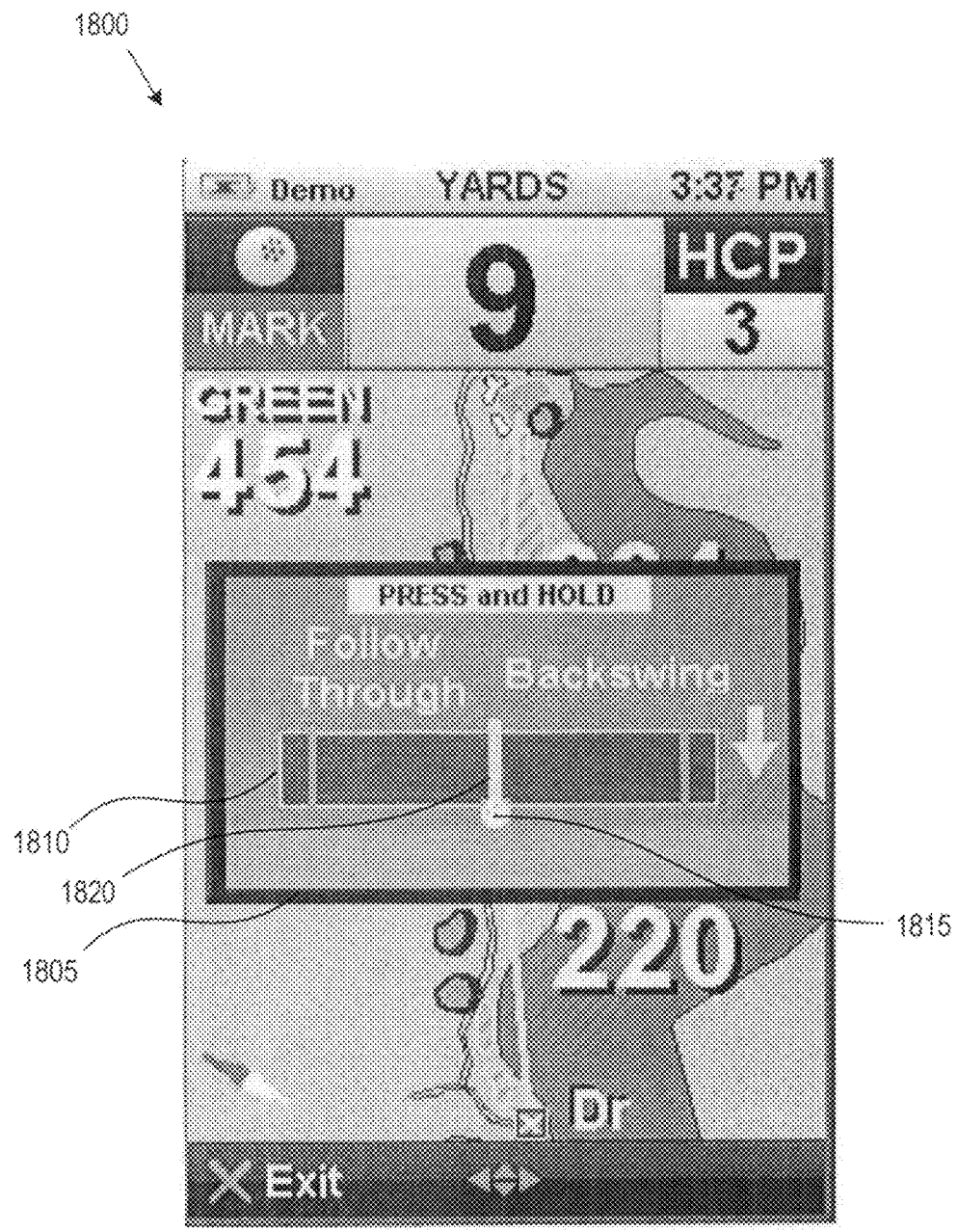
Figure 19:
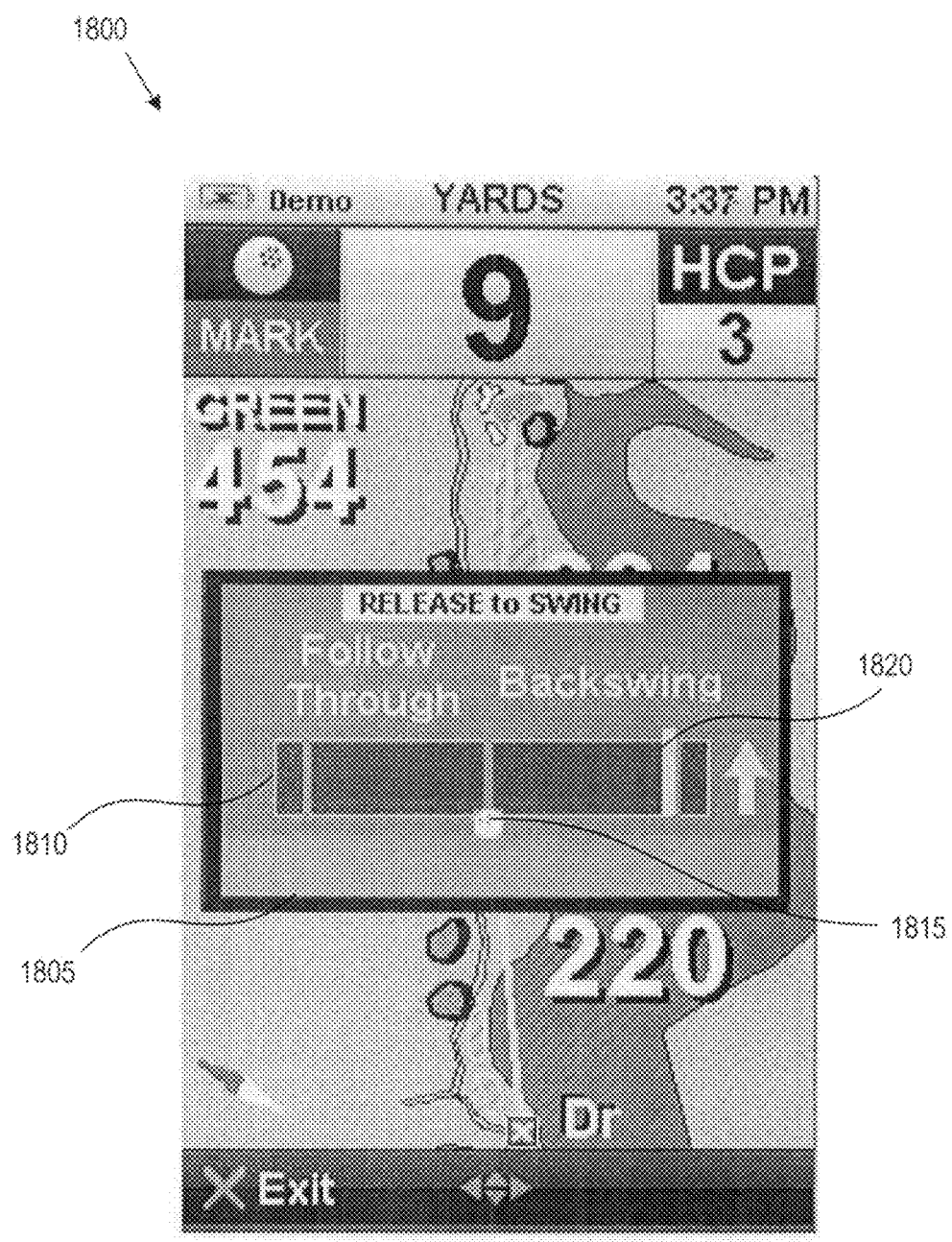

Referring first to FIG. 18, FIG. 18 includes a display interface that may be output at a beginning of a simulated shot. The interface 1800 includes a shot simulation area 1805, which includes a swing indication area 1810. The swing indication area 1810 includes an indication of a reference position 1815 and a club indicator 1820. In this non-limiting exemplary embodiment, the user may perform an input operation with respect to the interface 1800 in order to perform a simulated swing. For example, the user may perform a touch operation on any arbitrary area within the interface 1800 in order to control aspects of the swing. The reference position 1815 may represent an ideal reference position for striking the simulated ball. For example, the user may initiate the swing by tapping within the interface 1800, which may cause the club indicator 1820 to continuously move in a backswing direction (i.e., to the right). Following the movement in the backswing direction of the club indicator 1820, the user may again tap within the interface 1800 in order to end the backswing and move to the forward swinging motion of the simulated shot. FIG. 19 provides an illustrative example of the club indicator 1820 moving in a backswing direction.

Referring now to FIG. 19, in response to the touch operation performed by the user in order to commence the backswing, the indicator 1820 has moved rightward within the area 1810. The amount that the indicator 1820 moves to the right with respect to the reference position 1815 may, in certain embodiments, correspond to the power that will be used in calculating the distance of the simulated shot. That is, the farther that the indicator 1820 moves away from the reference position 1815, the greater power that will be simulated when calculating the features of the simulated shot. When the user wishes to end the backswing motion of the simulated swing and begin the forward motion of the simulated swing, the user may perform another input operation with respect to the interface 1800 when the user has determined that the indicator 1820 is at the desired position corresponding to the desired power of the simulated shot. In certain embodiments, the indicator 1820 may be in constant motion during the input operations for a simulated swing. Therefore, the user may have to incorporate skilled timing of his or her input operations in order to achieve the appropriate desired power amount for the swing.

Figure 20:
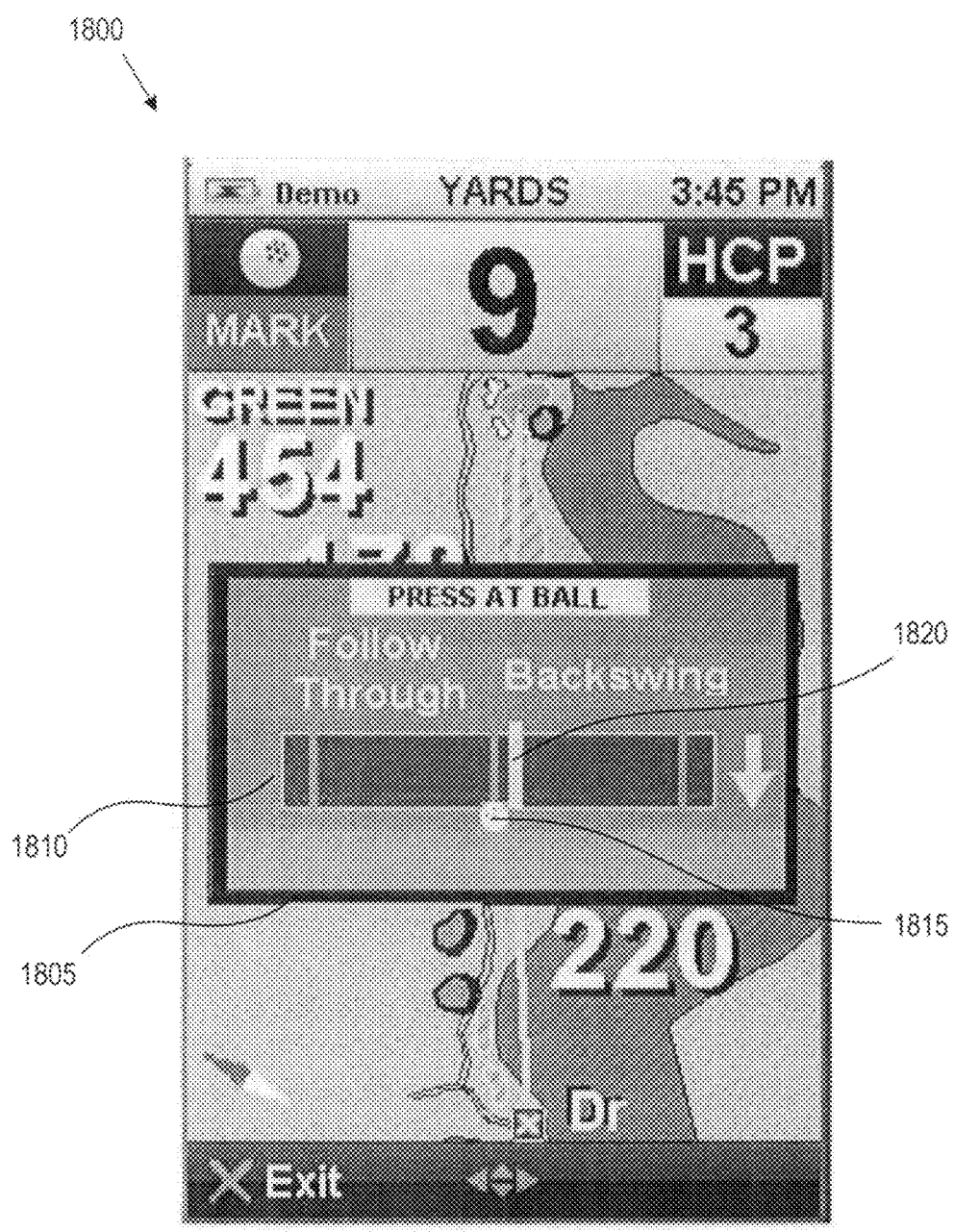

Upon receiving the input ending the backswing motion of the simulated swing, the controller 110 may control the display 120 such that the interface 1800 animates the indicator 1820 towards the left within the area 1810, which indicates that the backswing motion has stopped and the forward swinging motion has begun. To simulate striking the ball, another input operation may be detected with respect to the reference point 1815. For example, as the indicator 1820 moves to the left within the area 1810 during the forward swinging motion, the user may perform another input operation when he or she deems that the indicator 1820 is in close proximity to the reference position 1815. FIG. 20 provides a non-limiting example of an input operation when an input is received corresponding to the desired ball strike.

Referring now to FIG. 20, the club indicator 1820 has moved to the left in close proximity to the reference point 1815. The position of the indicator 1820 in FIG. 20 may correspond to the position when an input operation within the interface 1800 is detected (i.e. when the user wishes to strike the ball in the simulated shot). In certain embodiments, the controller 110 may analyze the position of the club indicator 1820 with respect to the reference position 1815 in order to determine a direction of the simulated shot. For example, if the controller 110 detects the input operation corresponding to the ball strike when the indicator 1820 is substantially at the position in the area 1810 corresponding to the reference position 1815, the controller 110 may determine that the simulated shot is a straight shot. Otherwise, if the controller 110 determines that the club indicator 1820 is to the right or to the left of the reference position 1815 (i.e. the user perform the input operation corresponding to the ball strike too soon or too late, respectively), the controller 110 may determine that the simulated shot should go to the right or the left, respectively. In certain embodiments, the comparison of the club indicator 1820 with respect to the reference position 1815 may also be incorporated in the determination of the shot path (i.e. whether the shot is a draw, fade, hook, slice, etc.). In other embodiments, other input operations may determine the shot path of the simulated shot (e.g. a button indicating a fade, draw, etc., that may be applied to the simulated shot).

Figure 21:
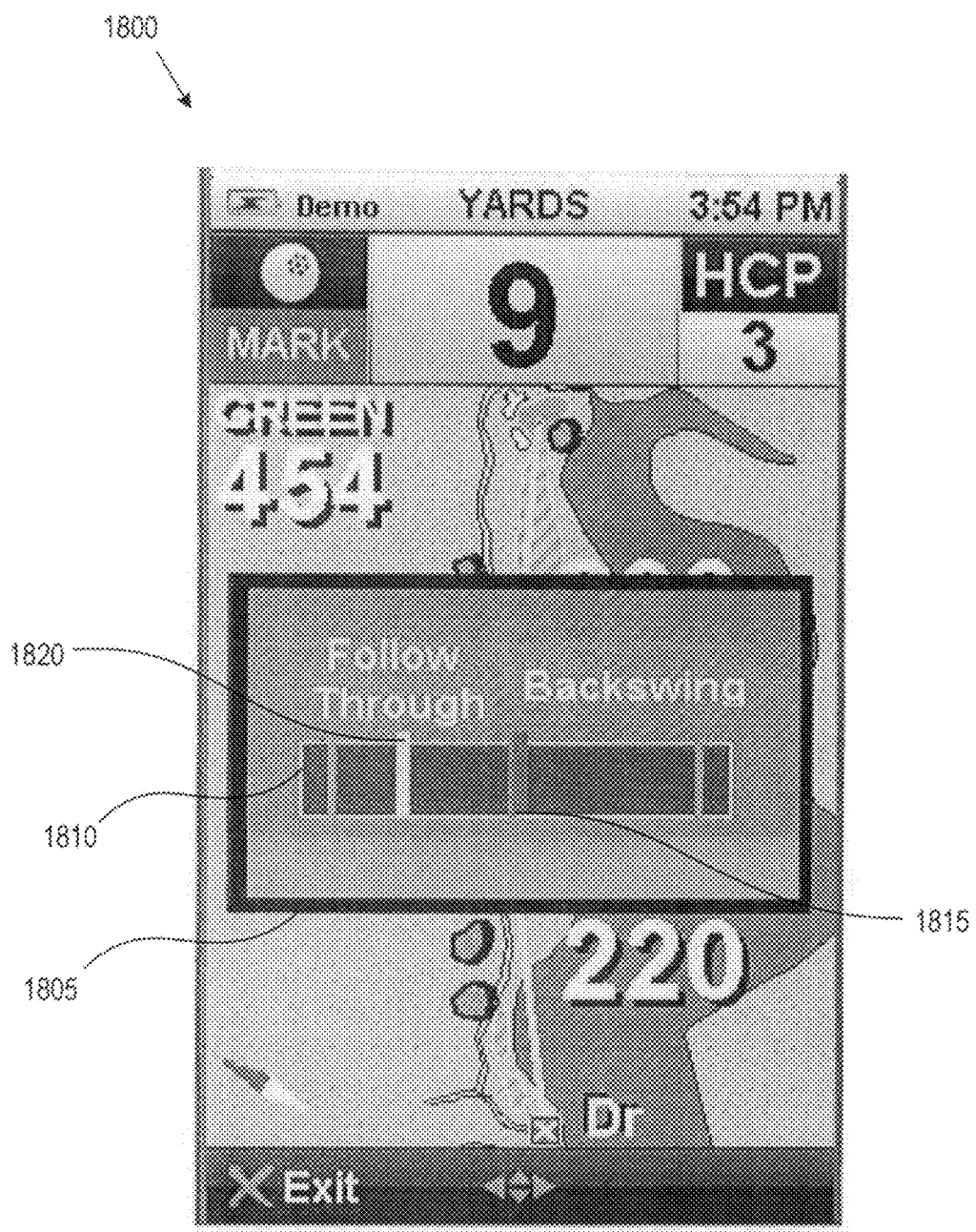

Following the simulated ball strike and the simulated shot, the controller 110 may continue controlling the display 120 such that the club indicator 1820 moves through the left of the area 1810 into the follow through area, simulating the follow through of the simulated swing. For example, the user may perform the input operation corresponding to the ball strike and hold this input operation (e.g. maintain contact with the display 120 while performing a touch operation) as the indicator moves through the follow through area. In this case, releasing the user's finger from the display 120 while the indicator 1820 is moving through the follow through area may result in stopping the simulated follow through. Stopping the follow through of the swing early (e.g. shortly after the ball strike position) may impact the outcome of the simulated shot. For example, the simulated shot may be calculated by the controller 110 to not travel as far as it would otherwise if the follow through was continued through the full range of the simulated motion. FIG. 21 illustrates a non-limiting example of the interface 1800 during the simulated swing follow through. Note the reference position 1815 no longer includes an image of a simulated ball, indicating that the simulated shot has occurred.

Figure 7:
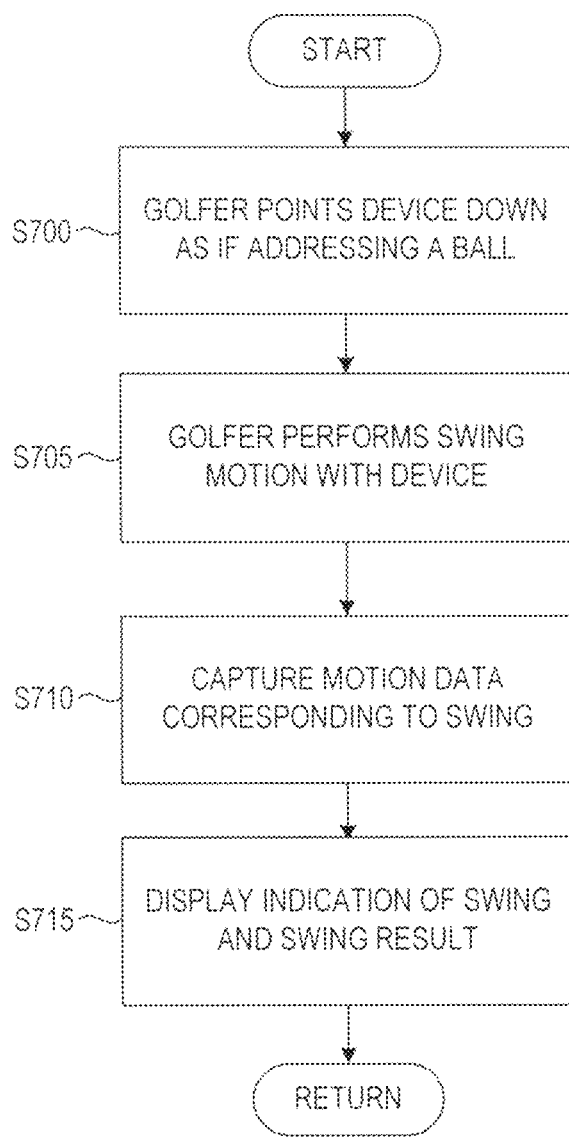
FIGS. 7-9 illustrate exemplary flowcharts corresponding to processing for a golf shot simulation, according to certain embodiments.

Next, FIG. 7 illustrates a non-limiting example of performing a simulated golf swing by performing a physical action with respect to the terminal device 100, according to certain embodiments. The exemplary interface screens discussed above with respect to FIGS. 18 through 21 may also be applicable to the processing illustrated and discussed herein for FIG. 7. Accordingly, for the sake of brevity a repeated discussion of FIGS. 18 through 21 will not be repeated here. However, in certain embodiments, other graphical representations of a simulated swing may also be utilized within the scope of the present disclosure.

At step S700, the golfer in the possession of the terminal device 100 points the terminal device 100 down as if addressing a simulated ball. For example, the user may hold the terminal device 100 in his or her hands as if holding the shaft of a golf club, and the terminal device 100 may be held out by the user as if the user is preparing to take a swing using a golf club. The motion sensor 108 may sense the position of the terminal device 100 as the user is performing this physical act. As a result, motion data may be generated by the motion sensor 108 and sent to the controller 110, which may determine that the motion of addressing a simulated ball is being performed and correlate this physical act with the beginning of the simulated swing. In one or more embodiments, a prompt on the user interface may guide the user in performing the physical action of simulating addressing a ball. For example, an output message displayed on the display 120 may direct the user to perform the action of addressing a simulated ball in order to begin the simulated swing.

At step S705, while holding the terminal device 100 as in step S700, the golfer then performs a swinging motion with the terminal device 100. For example, after addressing the simulated ball as in step S700, the user "swings" the terminal device 100 through a backswing motion and a follow through motion as if striking an actual golf ball.

As a result of performing this motion with the terminal device 100, the motion sensor 108 at step S710 may generate motion data corresponding to the swinging motion performed by the user. As a result, the controller 110 may analyze the swinging motion to determine various aspects of the user's swinging motion. For example, the controller 110 may receive the motion data from the motion sensor 108 and determine aspects of the user's simulated swing path, swing speed, swing tempo, position of the swing with respect to a swing plane, etc. The data generated by analyzing the motion data by the controller 110 may then be applied in calculating aspects of the user's simulated shot trajectory. For example, the controller 110 may determine, based on the analysis of the motion data, a trajectory and distance of the simulated golf shot.

At step S715, the controller 110 controls the display 120 such that an indication of the swing and swing result is displayed. For example, in certain embodiments, an animation of the simulated swing may be output on an interface displayed on the display 120 together with an indication of the resultant simulated swing trajectory. The displayed simulated swing result may include a graphical animation of the simulated golf ball traveling from the user's current location to a new simulated landing position, as displayed on the display 120. The user may then proceed on the actual golf course to the corresponding position of the simulated landing position such that either a simulated or actual shot may be taken from the simulated landing position. In certain embodiments, the graphical animation of the simulated swing may also include an output of various aspects of the swing, such as a numerical indication of the user's swing speed, swing tempo, etc., such that the user receives feedback with respect to the simulated swing. This feedback provided to the user may assist the user in correcting issues with his or her swing that may result in the simulated shot trajectory deviating from the trajectory of an ideal swing.

Figure 8:
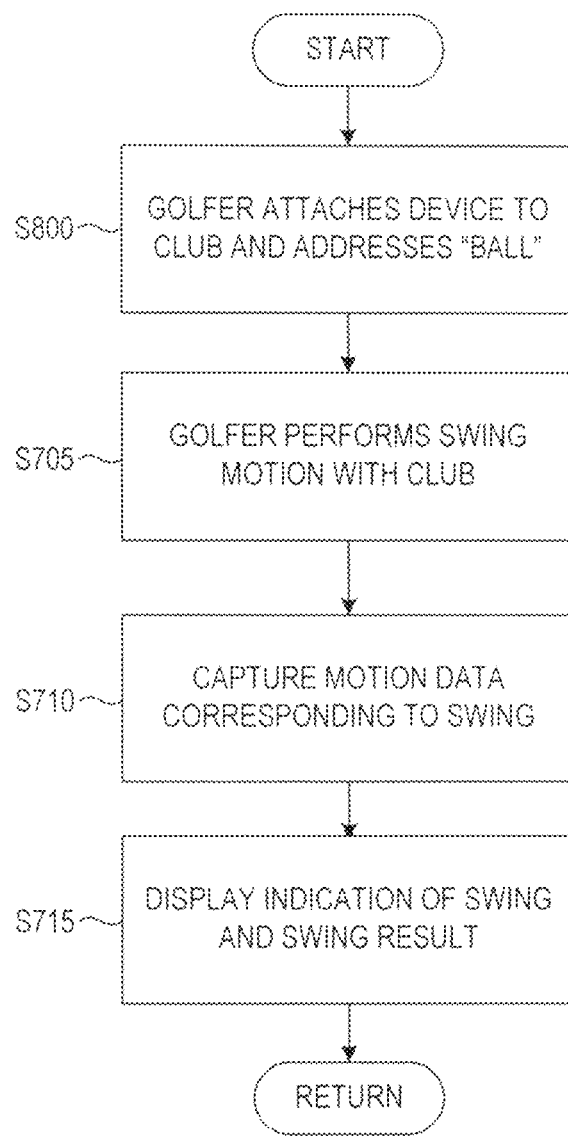

FIG. 8 illustrates processing relating to an embodiment in which the terminal device 100 may be affixed to a golf club such that a simulated swing may be performed with the golf club, albeit without hitting an actual ball. For example, the terminal device 100 may be outfitted with a clamping device such that the terminal device 100 may be mounted on the shaft of a golf club. Accordingly, a user may perform a simulated swing with an actual golf club while the terminal device 100 is mounted on the golf club, and motion data corresponding to the simulated swing may be captured by the motion sensor 108, similar to the above case of FIG. 7. Exemplary processing for capturing motion data using shaft-mounted motion sensors is described in U.S. application Ser. No. 13/744,308, which is incorporated herein by reference.

Referring to FIG. 8, the user performs the action of affixing the terminal device 100 to the club at step S800, and also performs the action of addressing the simulated ball in order to begin the simulated swing. The controller 110 may analyze motion data from the motion sensor 108 to determine when the user is addressing the simulated ball. The remaining actions with respect to performing the simulated swing motion and the capturing of the relevant data with respect to the simulated swing (steps S705, S710, and S715) are performed similarly to the above example discussed for FIG. 7. Performing the simulated swing while mounting the terminal device 100 on an actual club improves the user's experience by adding realism to the simulated swing process and allowing the user to actually physically experience the key aspects of playing a round of golf without actually hitting an actual golf ball.

The skilled artisan will appreciate that the above examples of performing a simulated golf swing and then capturing motion data with respect to the simulated golf swing are provided merely for examples, and other methods of performing swing and capturing relevant motion data with respect to the simulated swing are within the scope of the present disclosure. That is, any input operation performed with respect to the terminal device 100 may be translated into a simulated swing, regardless of whether the input operation includes a physical action or other input that is similar to an actual golf swing. For example, the user may simply input information directly into an interface on the display 120 indicating how the simulated swing should be performed, and the controller 110 may correlate these inputs into motion data for determining a simulated shot trajectory for the simulated swing. Alternatively, the user may merely select a simulated club for use in the simulated swing, and the controller 110 may apply default settings for the simulated club and for the simulated swing in order to calculate a simulated shot trajectory.

Figure 9:
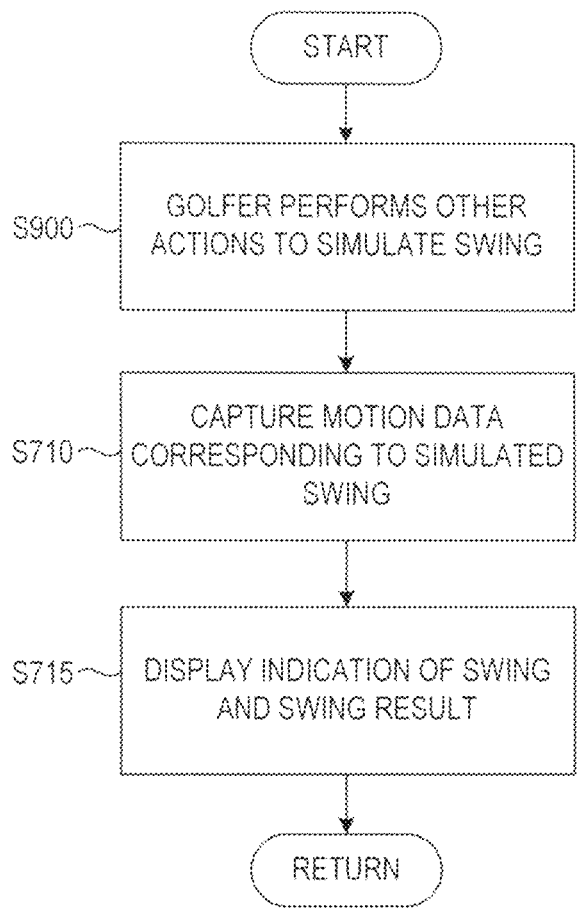

FIG. 9 illustrates general processing performed for a simulating swing in other alternative embodiments. Specifically, step S900 of FIG. 9 includes any action that may correspond to a simulated swing, and step S710 and step S715 correspond to processing related to capturing motion data and displaying a swing result and swing simulation in response to the action performed at step S900.

Figure 10:
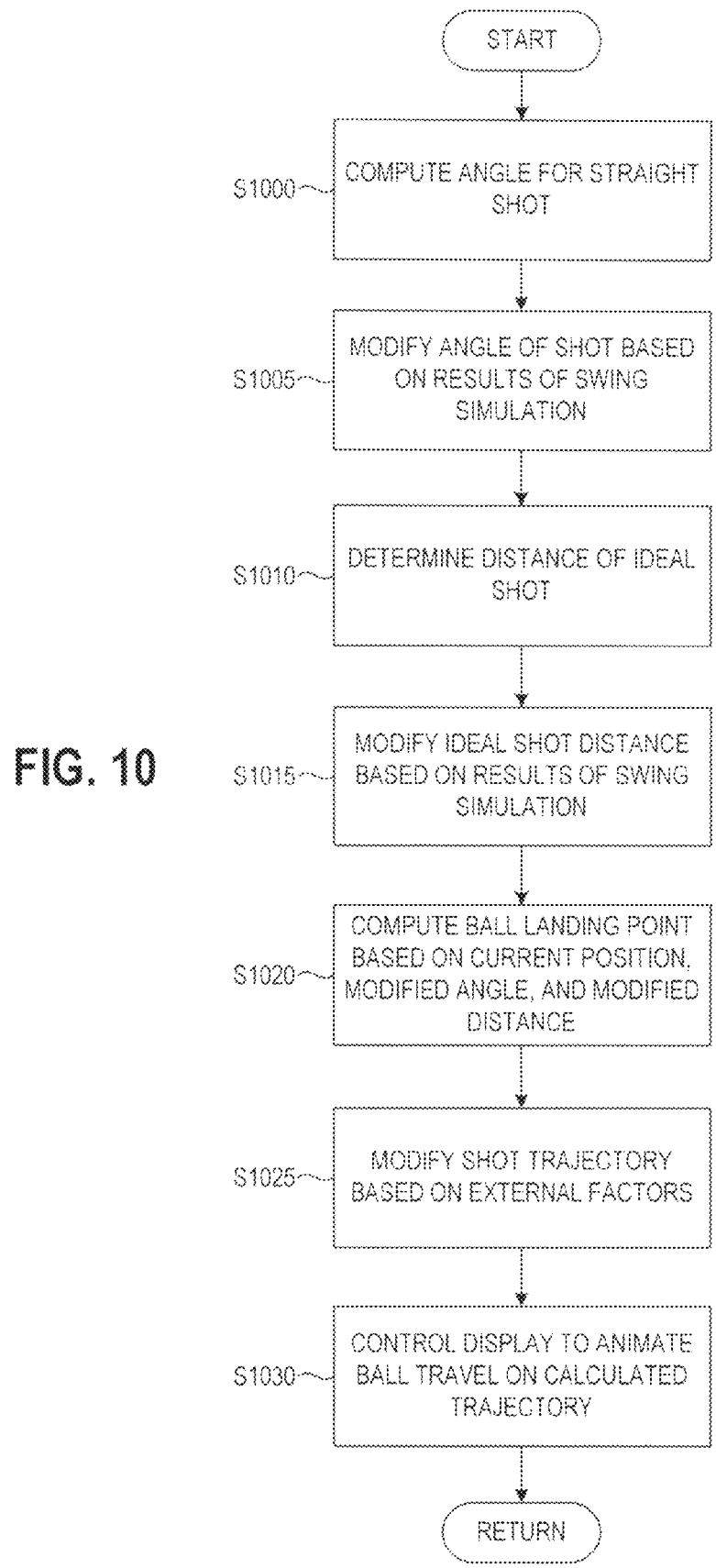
FIG. 10 illustrates an exemplary flowchart corresponding to processing for calculating features of a simulated golf shot, according to certain embodiments.

Next, FIG. 10 illustrates an exemplary flowchart corresponding to processing for calculating features of a simulated golf shot, according to certain embodiments.

At step S1000, based on the user's current location derived from the position data from the position sensor 109 and the target position of the simulated shot input by the user (e.g. the position of a cursor on an interface displayed on the display 120 such as the cursor icon 1415), the controller 110 computes an angle for a straight shot. For example, the user's current latitude and longitude may be translated into display coordinates corresponding to the display 120. Additionally, the display coordinates of the cursor icon 1415 may be analyzed by the controller 110 such that a direction from the user's current position (i.e. icon 1410) to the target position represented by the cursor icon 1415 may be determined, whereby this direction corresponds to the direction/angle of a straight shot. The angle of the straight shot, in certain embodiments, represents a simulated shot trajectory in an ideal scenario (i.e. the simulated swing is performed such that the various motion data corresponding to the simulated swing substantially match motion data that would be derived from a user performing an ideal golf swing).

At step S1005, the controller 110 modifies the angle of the straight shot based on the results of the simulated swing. That is, based on the results of the simulated swing processing discussed above at least with respect to FIGS. 5 through 9, the controller 110 may determine whether the simulated shot path should deviate from the straight shot path. For example, the controller 110 may determine based on input operations performed during the simulated swing that the user strikes the simulated ball before or after an ideal timing corresponding to an ideal swing. As a result, the controller 110 may determine an amount that the actual shot path of the simulated swing should move to the right or the left with respect to the straight shot path. For example, referring to FIG. 20, the controller 110 may determine that the simulated shot path should be to the right of the straight shot path by an angle proportional to the magnitude of separation of reference position 1815 and club indicator 1820.

Referring back to FIG. 10, at step S1010, the controller 110 determines an ideal distance of a "good" shot based, e.g., on the normal distance of a shot hit with the selected club. In embodiments where a club selection is not performed, the controller 110 may use the distance from the user's current position to the position of the cursor representing the target position of the simulated shot.

At step S1015, the controller 110 modifies the ideal shot distance based on the results of the simulated swing. For example, the motion data generated by the motion sensor 108 as a result of performing the simulated swing with respect to the terminal device 100 may indicate that the user's simulated swing is greater than or less than 100% power. As a result, the controller 110 may appropriately modify the ideal swing distance based on the actual swing power of the simulated swing. This calculation may be represented by the formula: Distance=% Power×Ideal Shot Distance.

At step S1020, the controller 110 computes the simulated ball landing position based on the users' current position, the adjusted angle of the simulated shot, and the adjusted shot distance of the simulated shot. Moreover, in embodiments in which the shot trajectory may be modified by incorporating a draw, fade, slice, etc., the controller 110 may further modify the simulated ball landing position based on these swing aspects.

At step S1025, the controller 110 may further modify the simulated shot trajectory based on various external factors. For example, the controller 110 may determine based on course data in the memory 150 that the simulated shot trajectory moves through an area that includes trees. In this case, the controller 110 may determine a probability of hitting a tree with the calculated shot trajectory and, if it is determined by the controller 110 that the simulated shot hits the trees, the controller 110 may determine a tree strike point and determine an effect of the simulated shot trajectory as a result of hitting the tree. For example, the controller 110 may calculate a distance traveled and a direction of the simulated ball following the hitting of the tree, and the controller 110 may update the simulated ball landing position accordingly. Similar processing may be performed by the controller 110 in response to determining that the simulated shot trajectory moves through other hazards, such as a cart path, sand trap, rough area, water hazard, etc. Moreover, in certain embodiments, the controller 110 may determine that the simulated shot trajectory places the user's simulated ball out of bounds, in which case the controller 110 may control the display 120 such that the interface displayed on the display 120 prompts the user to determine whether a new shot will be taken from the current location or if the user wishes to take other actions with respect to the ball hit out of bounds (e.g., take a mulligan, re-hit the shot, etc.).

At step S1030, the controller 110 controls the display 120 such that an animation of ball travel based on the calculated simulated shot trajectory is displayed on the display 120, including an indication of the simulated shot's calculated landing position.

FIGS. 22 through 26 illustrate exemplary display interfaces that may be output as a result of the processing performed at least with respect to FIG. 10.

Figure 22:
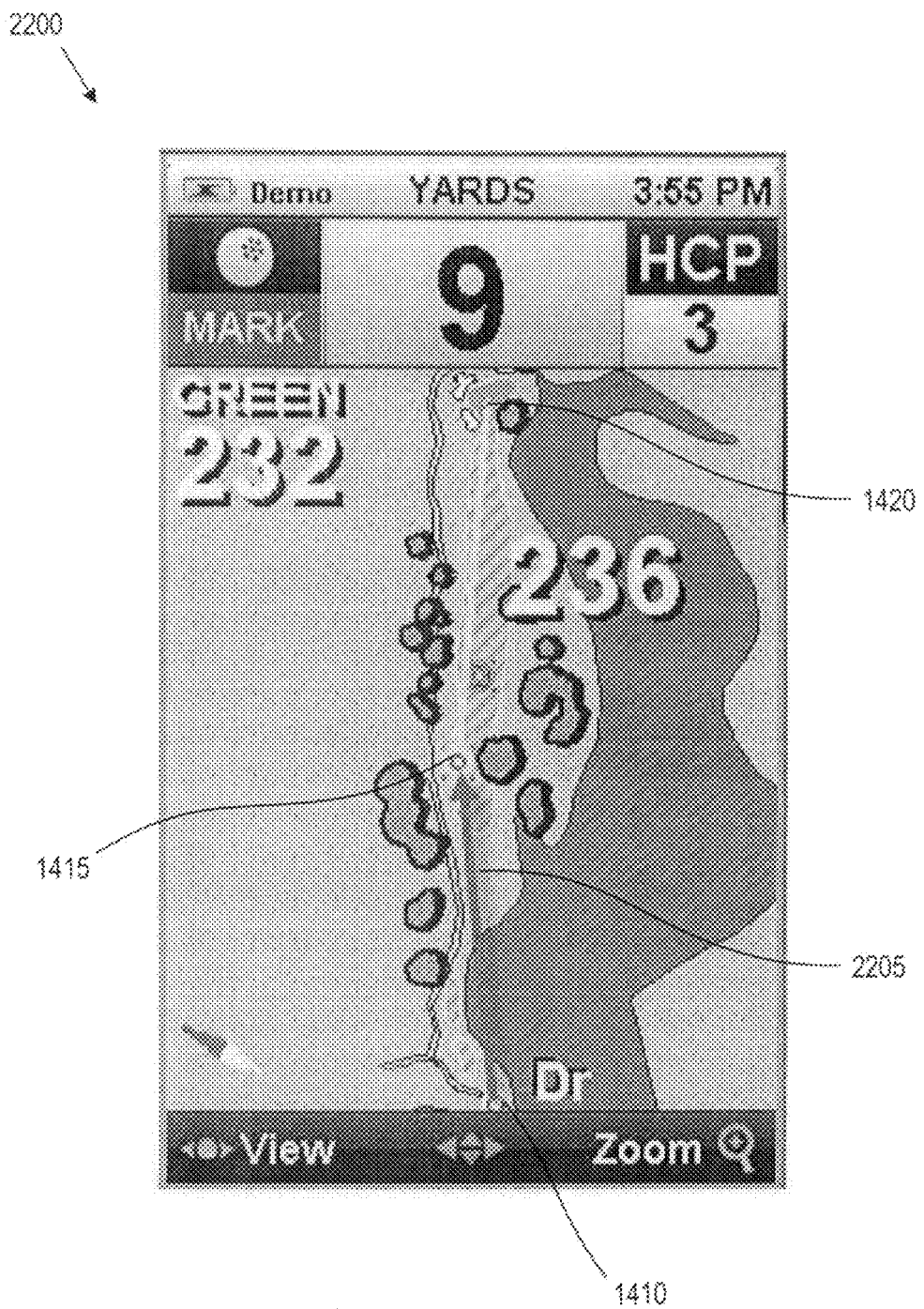

Referring first to FIG. 22, FIG. 22 illustrates an interface in which the calculated shot trajectory of the simulated shot results in a straight shot path. In this example, the user may perform an input operation indicating that the target position of the simulated shot corresponds to the cursor icon 1415 location. Based on the results of the simulated swing, the controller 110 may determine that the shot path is substantially straight such that the simulated shot travel moves toward the cursor icon 1415 position. The straight shot path is represented in FIG. 22 by arrow 2205. The arrow 2205 may or may not be output on the actual interface 2200 illustrated in FIG. 22.

Figure 23:
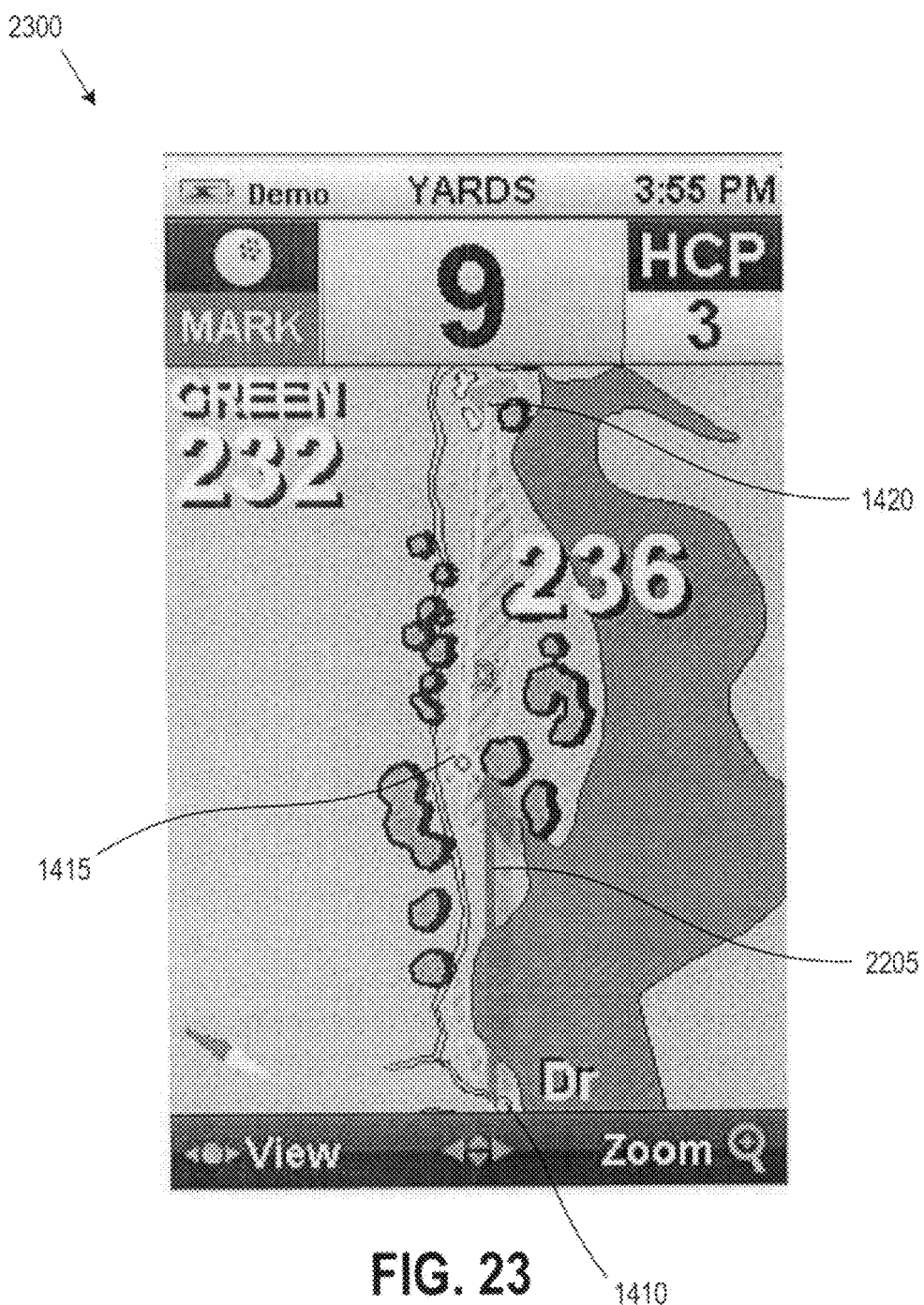

FIG. 23 illustrates an interface in which the controller 110 determines that the shot path deviates from the straight shot path. In this example, the controller 110 may determine based on the results of the simulated swing analysis that the simulated shot path travels to the right of a shot path corresponding to a straight shot. For example, the controller 110 may determine that the simulated ball "strike" occurs at a timing other than the timing of an ideal ball strike. As a result, the controller 110 may calculate an angle at which the simulated shot path deviates from the straight shot path. The arrow 2205 in FIG. 23 represents the shot path deviating to the right of the straight shot path with respect to the target position represented by cursor icon 1415. The arrow 2205 may or may not be output within the actual display interface 2300. That is, the arrow 2205 may, in certain embodiments, be output within the interface 2300 such that the user has a visual indication of the shot path deviation, or alternatively, the arrow 2205 may be merely provided in this example to illustrate the deviation in shot path without actually being output within the display interface 2300.

Figure 24:
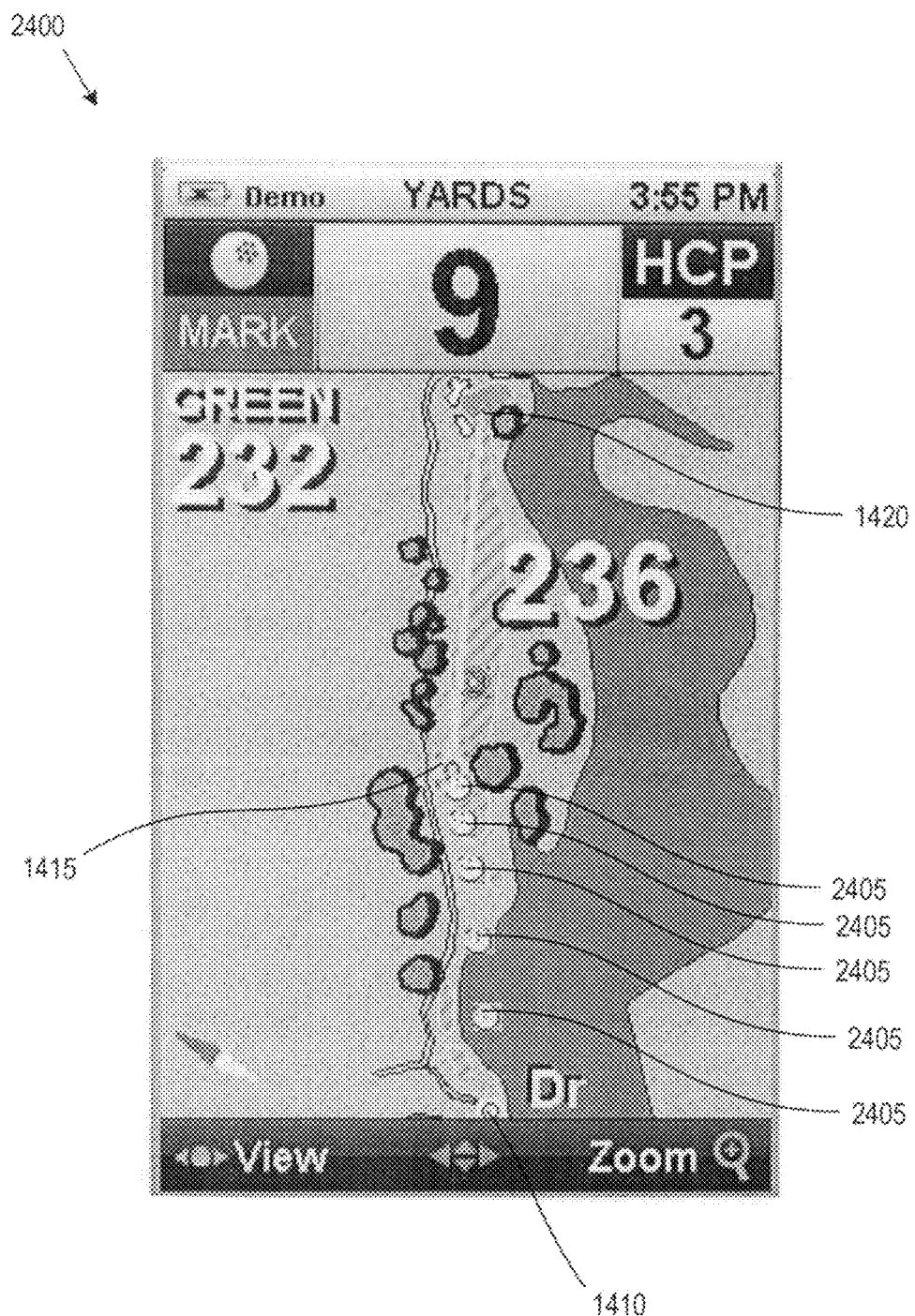

FIG. 24 illustrates an example of animating a simulated shot trajectory on a display interface. The display interface 2400 illustrated in FIG. 24 illustrates the temporal progression of a simulated ball 2405 traveling from the user's current position to the target position represented by cursor 1415. The spacing, arcing, direction, etc. of the simulated ball 2405 may be varied based on the simulated ball speed, direction, etc., calculated when determining the simulated shot trajectory. In certain embodiments, the display interface 2400 may include a single simulated ball indication 2405 that moves from the current location 1410 to the target position 1405, rather than the path of simulated ball positions as is illustrated in FIG. 24.

Figure 25:
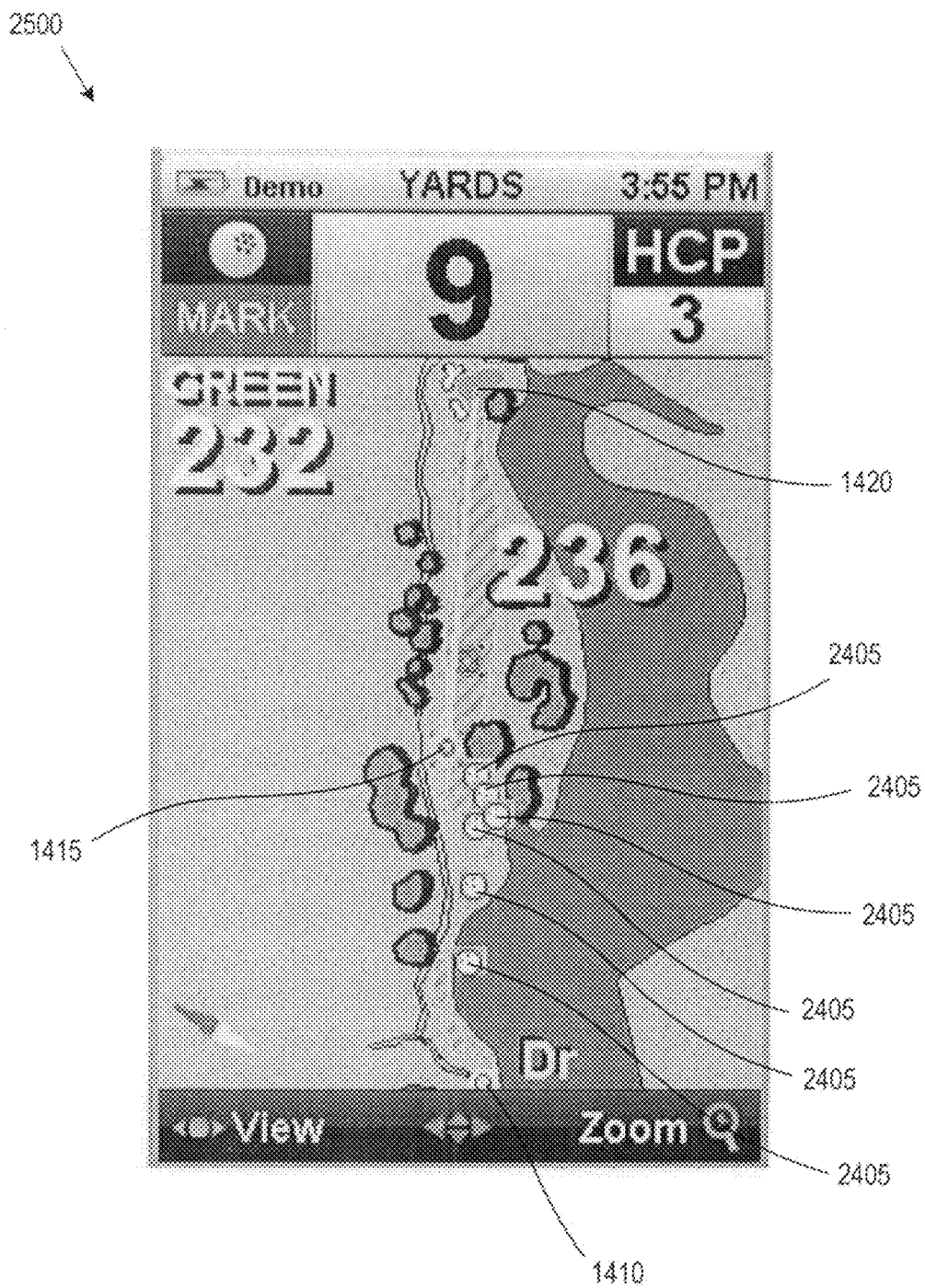

FIG. 25 illustrates an exemplary interface in which the simulated ball trajectory is influenced by external factors. The exemplary interface of FIG. 25 may correspond to a modified shot trajectory determined based on processing performed at step S1025 in FIG. 10. The exemplary display interface 2500 illustrated in FIG. 25 represents a case in which the controller 110 determines that the simulated shot trajectory moves through the path of an area including a plurality of trees. As a result of determining that the shot trajectory moves through the trees, the controller 110 modifies the calculated shot trajectory such that the behavior of the simulated ball is representative of striking a tree. For example, the controller 110 may determine a probable direction and speed that the simulated shot will take following the striking of the tree, and modify the shot trajectory accordingly. The processing related to the modification of shot trajectory based on the external factors is represented in the display interface 2500 by the varied position of the simulated ball indication 2405.

Figure 26:
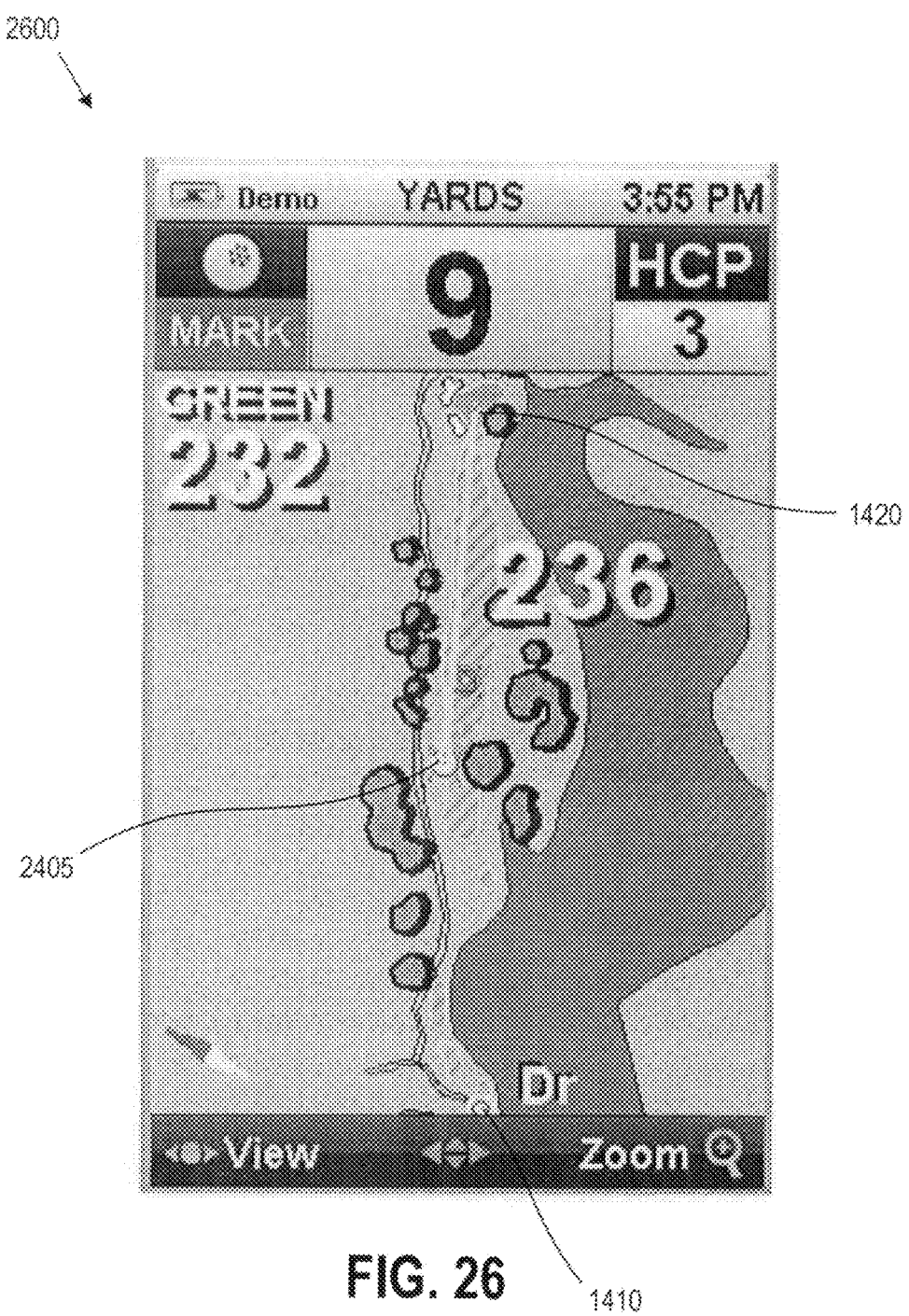

FIG. 26 illustrates an exemplary display interface 2600 that may be displayed at the conclusion of a simulated shot. In this example, it may be assumed that the animation corresponding to the simulated shot is completed and the simulated ball is in its final landing position, as indicated by the simulated ball indication 2405 in the interface 2600. It is noted that the user is still determined to be at the location represented by icon 1410 in this example. However, the representation of the final simulated ball position 2405 with respect to the user's current location provides the user with a visual indication that may be used as a guide for proceeding from the user's current location to an actual position on the golf course corresponding to the simulated ball position 2405. That is, although a simulated shot was performed in this example, the user is assumed to be present on the golf course displayed within the interface 2600, and the user may physically proceed to a physical location corresponding to the display position of the simulated ball 2405 such that the user is allowed to experience the benefits of participating in an actual round of golf without necessarily performing each and every physical shot in the round.

Figure 11:
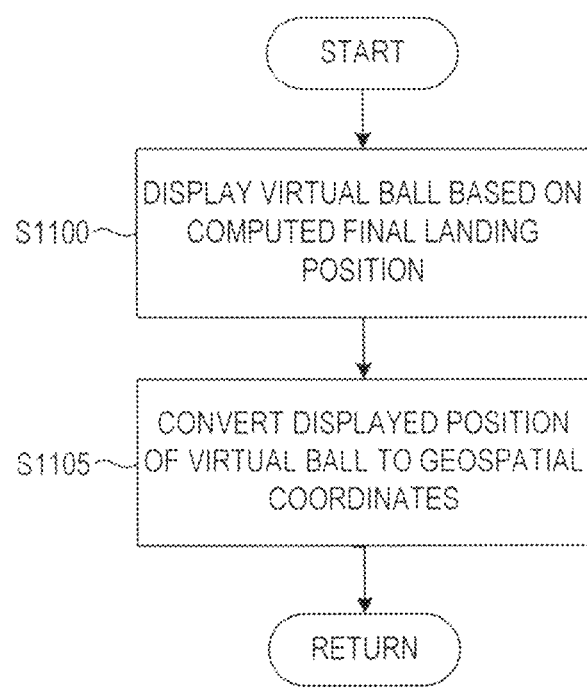
FIG. 11 illustrates an exemplary flowchart corresponding to processing for controlling a display interface such that a simulated ball position is displayed, according to certain embodiments.

Next, FIG. 11 illustrates an exemplary flowchart corresponding to processing for controlling a display interface such that a simulated ball position is displayed, according to certain embodiments.

Figure 27:

At step S1100, the controller 110 controls the display 120 such that the final landing position of the simulated ball is output on an interface displayed on the display 120. As discussed previously, the final landing position corresponds to the endpoint of the simulated shot trajectory. FIG. 27 illustrates a non-limiting exemplary interface 2700 that includes an indication of the simulated ball 2405 at its final landing position within the interface.

At step S1105, the controller 110 converts the display coordinates of the final landing position of the simulated ball to geospatial coordinates corresponding to a physical location on the golf course. For example, referring to the exemplary interface of FIG. 27, the controller 110 may convert the XY display coordinates of the final simulated ball position 2405 into latitude and longitude geospatial coordinates of the golf course represented on the interface. The conversion of the display coordinates of the simulated ball into actual geospatial coordinates may allow the controller 110 to provide guidance via the interface displayed on the display 120 for the user to proceed to the geospatial location corresponding to the simulated ball landing position.

Figure 12:
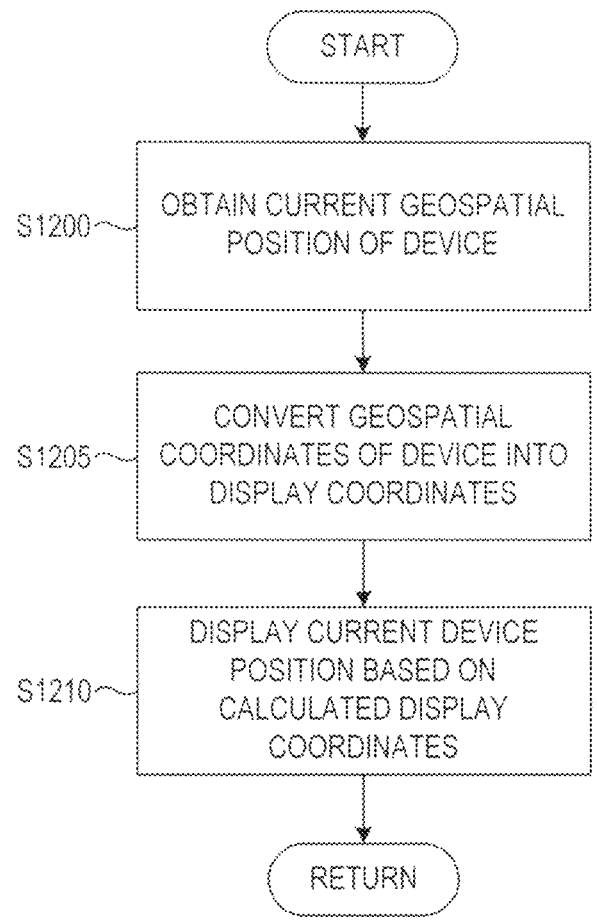
FIG. 12 illustrates an exemplary flowchart corresponding to processing for controlling a display interface such that a current position of a golfer is displayed on the interface.

Next, FIG. 12 illustrates an exemplary flowchart corresponding to processing for controlling a display interface such that a current position of a user in possession of the terminal device 100 is displayed on an interface output by the terminal device 100.

At step S1200, the controller 110 attains the golfer's current latitude and longitude geospatial coordinates from the position sensor 109.

At step S1205, the controller 110 converts the user's latitude and longitude position into an XY display coordinates corresponding to the display 120. In certain embodiments, the processing performed at step S1205 may include mapping the user's geospatial coordinates to display coordinates included in the hole data stored in the memory 150.

At step S1210, the controller 110 controls the display 120 such that the user's current location is displayed within an interface using the converted display coordinates determined at step S1205. The icon 1410 in the interface 2700 of FIG. 27 provides a non-limiting example of displaying a user's current position based on converted display coordinates.

Figure 13:
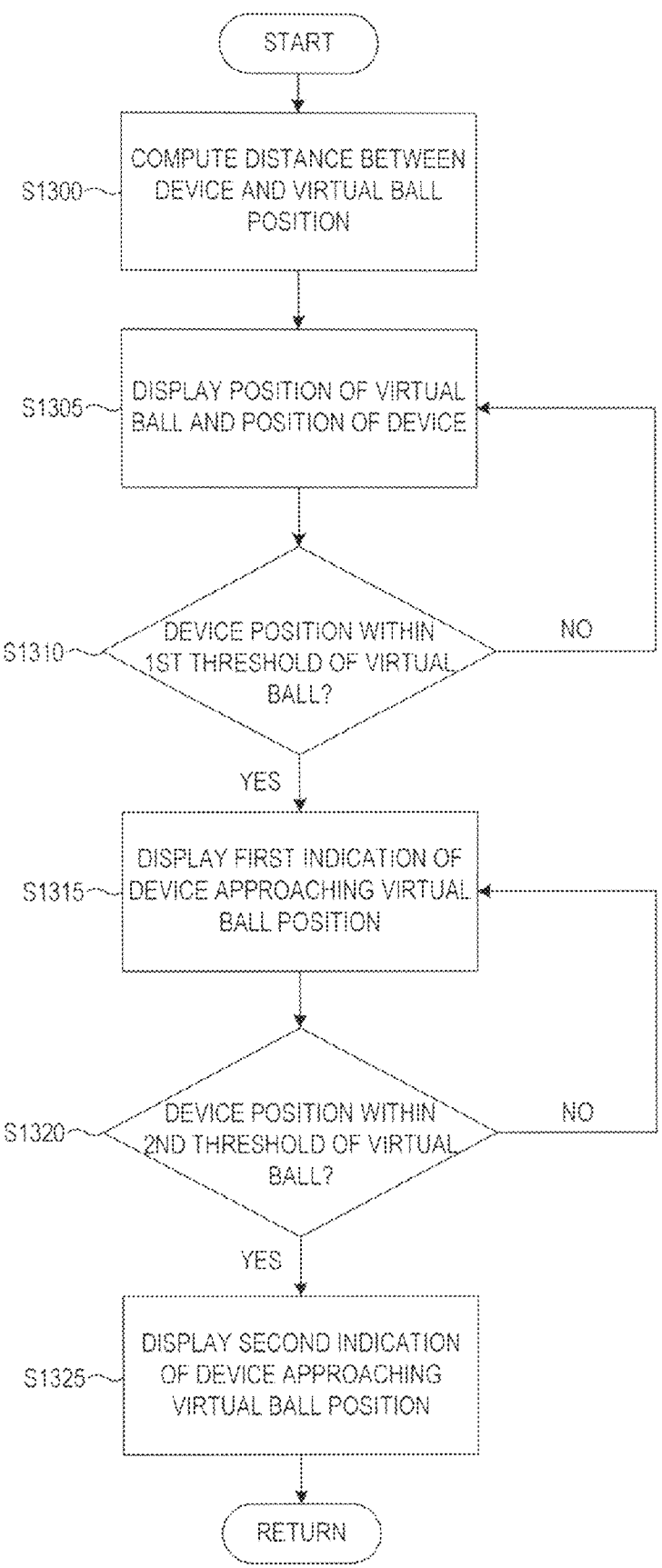
FIG. 13 illustrates an exemplary flowchart corresponding to processing for controlling a display interface to display visuals for assisting a golfer in moving to an actual geospatial position corresponding to a simulated ball location displayed on an interface, according to certain embodiments.

Next, FIG. 13 illustrates an exemplary flowchart corresponding to processing for controlling a display interface to display visuals for assisting a golfer in moving to an actual geospatial position corresponding to a displayed simulated ball location, according to certain embodiments.

At step S1300, the controller 110 computes the distance between the current location of the terminal device 100 and the simulated ball position. The distance between the two positions may be calculated based on geometric relationships between the geospatial position of the device and the corresponding geospatial position of the displayed simulated ball location (e.g., XY display coordinates of the displayed ball translated into geospatial coordinates).

At step S1305, the controller 110 controls the display 120 such that the position of the simulated ball and the position of the device are displayed on an interface output on the display 120.

At step S1310, the controller 110 continuously updates the displayed position of the terminal device 100 on the interface and it continuously monitors the distance between the current device position and the geospatial location corresponding to the simulated ball position. The controller 110 determines at step S1310 whether the current position of the terminal device 100 is within a first threshold range of the geospatial position corresponding to the display position of the simulated ball. For example, the controller 110 may determine at step S1310 whether the current device position is within 30 yards of the geospatial location corresponding to the display position of the simulated ball. If the controller 110 determines that the terminal device 100 is not within the first threshold range of the simulated ball position, the process returns to step S1305.

Otherwise, if the controller 110 determines that the terminal device 100 is within the first threshold range of the geospatial location corresponding to the simulated ball display position, the controller 110 at step S1315 controls the display 120 such that a first indication of the terminal device 100 approaching the simulated ball position is output on the display interface. For example, in certain embodiments, the controller 110 may control a display 120 such that rings are flashed around the simulated ball position on the display 120 in order to indicate that the user is within the first threshold range of the geospatial position corresponding to the display location of the simulated ball.

Figure 28:
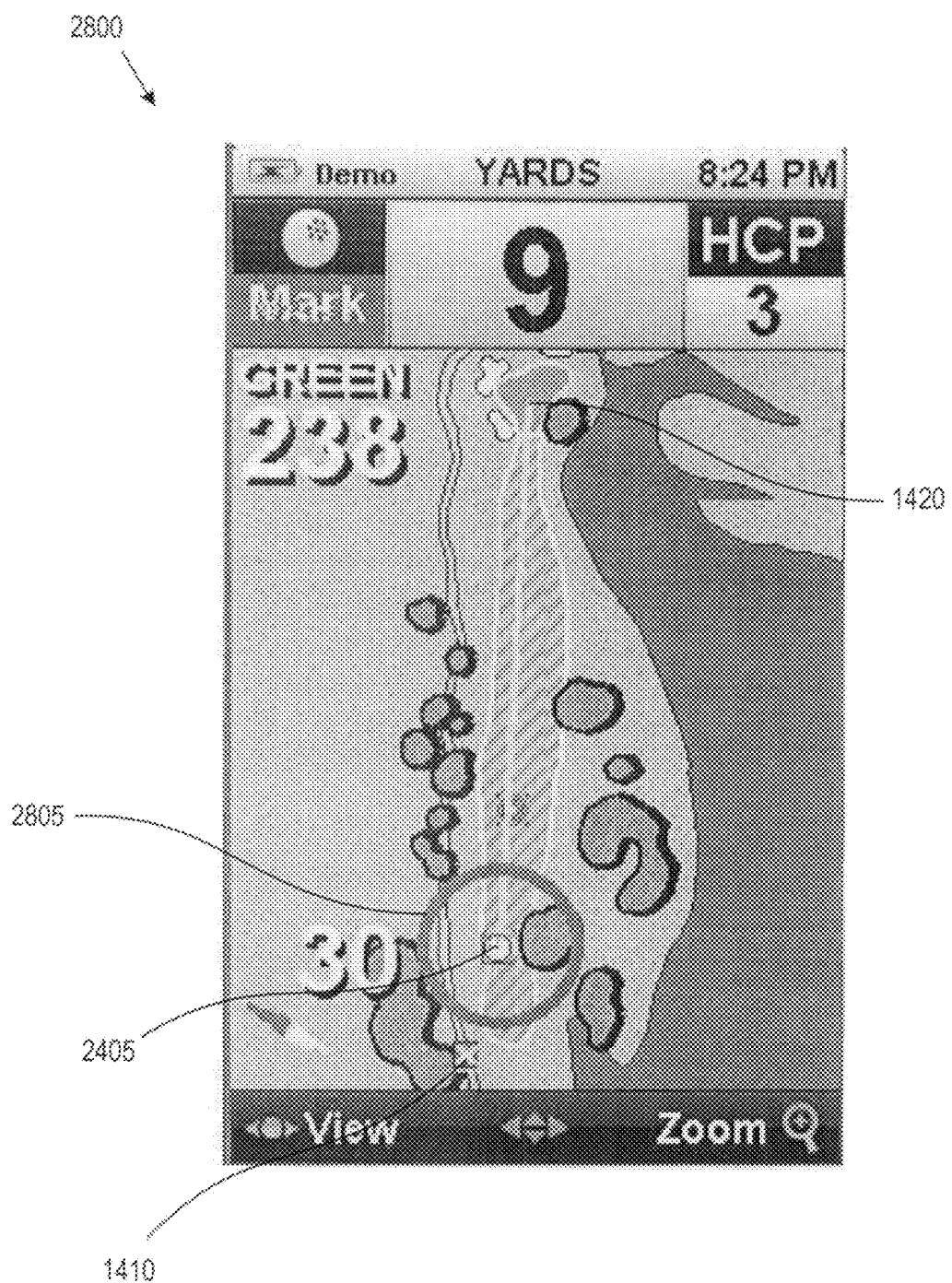

FIG. 28 illustrates a non-limiting example of a display interface 2800 that may be output during the processing corresponding to step S1315. Referring to FIG. 28, it is assumed in this example that the current position of the terminal device represented by icon 1410 is within the first threshold range of the simulated ball position represented by icon 2405. In response to determining that the current position of the terminal device 100 is within the first threshold range, the controller 110 controls the display 120 such that a ring 2805 is flashed around the display position of the icon 2405, thereby providing a visual indication to the user that he or she is approaching the geospatial position corresponding to the displayed position of the simulated ball.

Referring back to FIG. 13, at step S1320, the controller 110 determines whether the geospatial position of the terminal device 100 is within a second threshold range of the geospatial position corresponding to the display position of the simulated ball. For example, the controller 110 may determine at step S1320 whether the geospatial position of the terminal device 100 is within 5 yards of the geospatial position corresponding to the displayed position of the simulated ball. If the controller 110 determines that the geospatial position of the terminal device 100 is not within the second threshold range at step S1320, the process returns to step S1315.

Otherwise, at step S1325, the controller 110 controls the display 120 such that a second indication of the terminal device 100 approaching the simulated ball position is output on an interface on the display 120.

Figure 29:
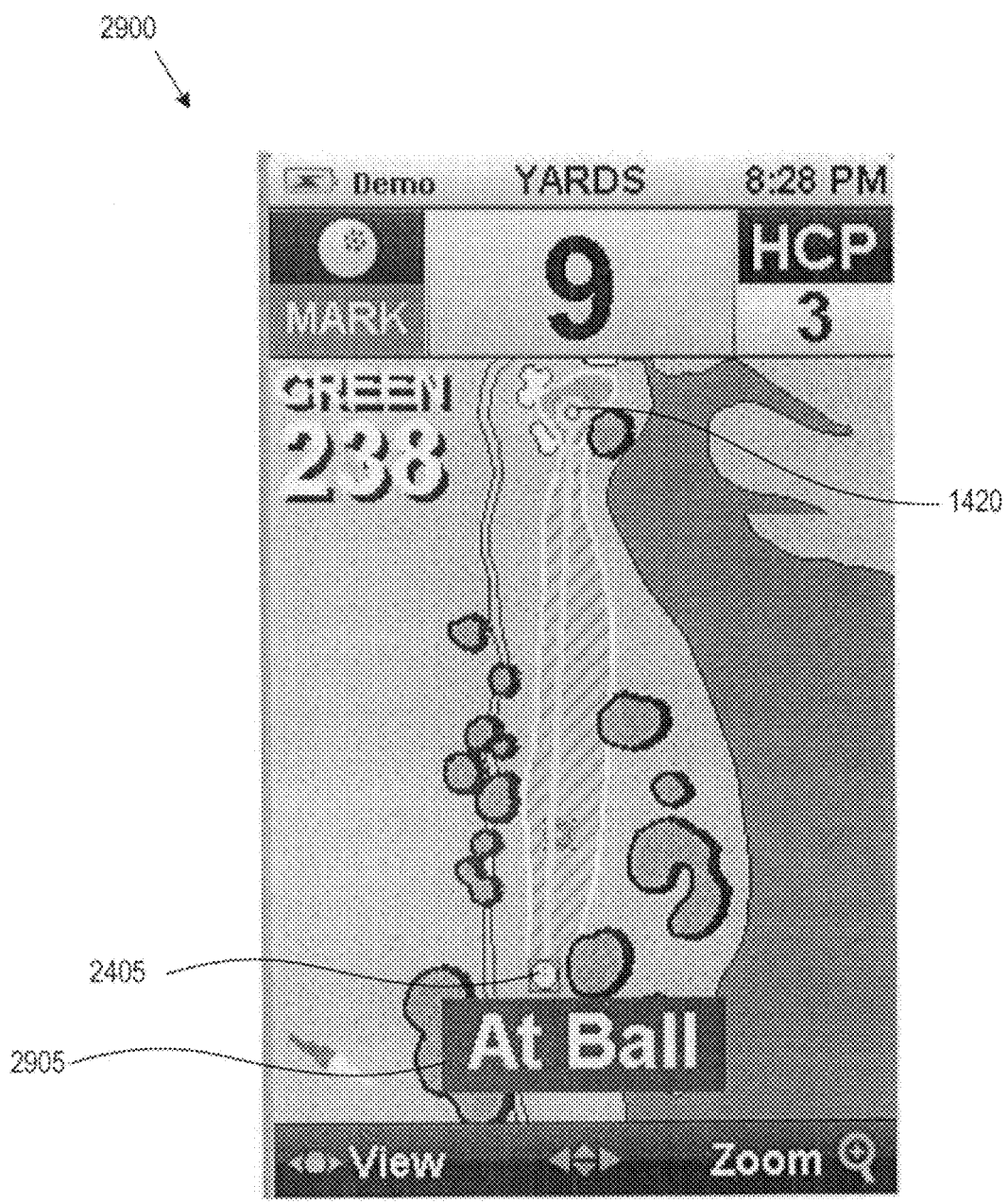

FIG. 29 provides a non-limiting illustrative example of an interface 2900 that may be output as a result of processing performed at step S1325. Referring to FIG. 29, this example assumes that the controller 110 has determined that the geospatial position of the terminal device 100 is within the second threshold of the geospatial position of the simulated ball represented by the icon 2405 within interface 2900. In response to determining that the geospatial position of the terminal device 100 is within the second threshold range, the controller 110 controls the display 120 such that a message 2905 is output on the display 2900. The message 2905 indicates that the user is physically present at the geospatial position corresponding to the simulated ball position (i.e., "At Ball"), and the user may then decide whether to hit an actual ball from the new geospatial position or whether another simulated shot will be performed.

Figure 30:
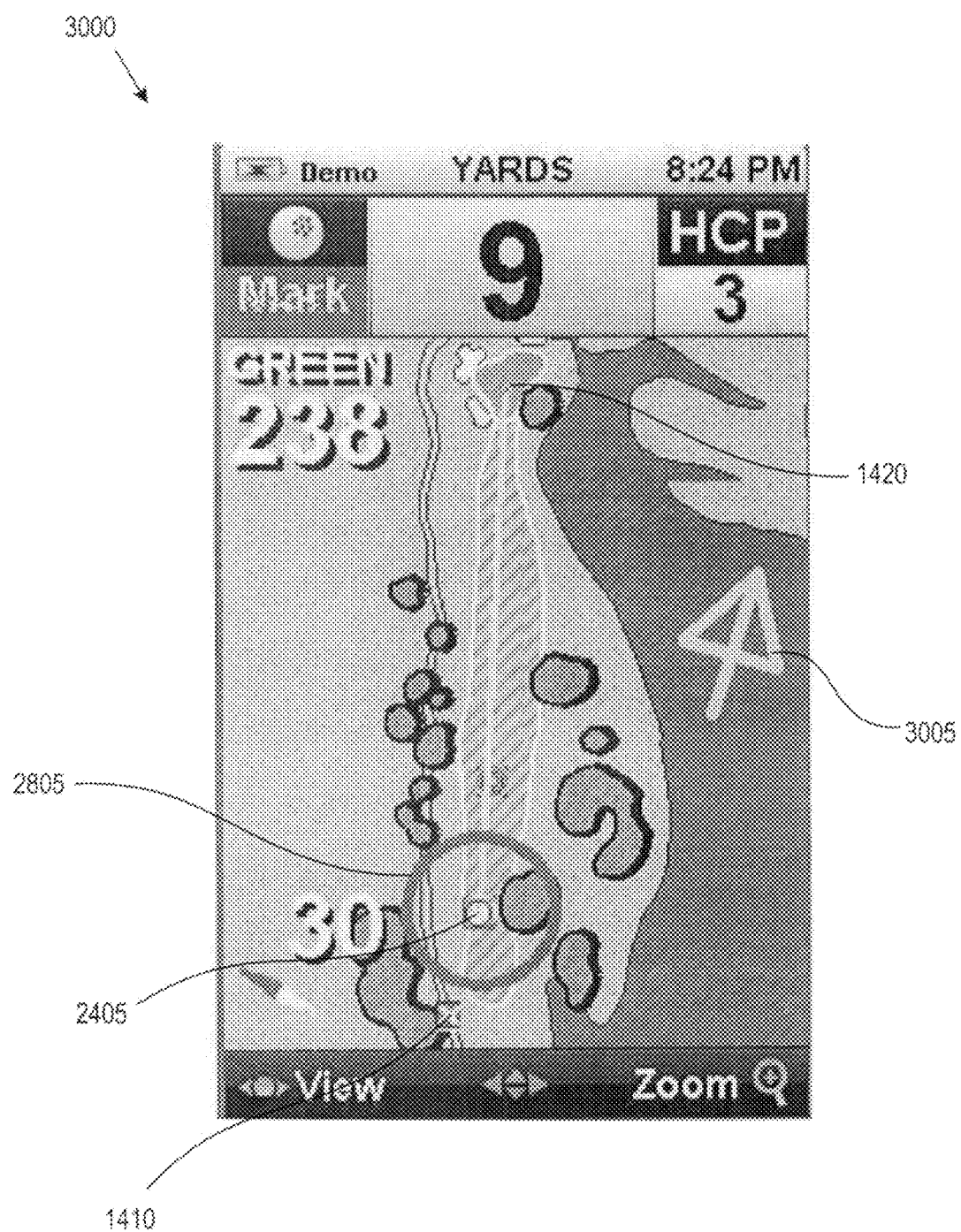

In certain embodiments, other visual indications that guide the user to the geospatial position corresponding to a simulated ball position may be output on the display 120. FIG. 30 provides a non-limiting example of an interface that may be output in order to guide the user from his or her current location to a geospatial position corresponding to a simulated ball location. Referring to FIG. 30, an interface 3000 is output on the display 120 in the condition in which the terminal device 100 is within the first threshold range with respect to the geospatial position corresponding to simulated ball position 2405. The ring 2805 is output on the interface 3000 to indicate that the user is within the first threshold range. In order to assist the user in proceeding to the geospatial position corresponding to simulated ball position 2405, the controller 110 controls the display 120 such that an arrow 3005 is output within the interface 3000. The arrow 3005 has a direction corresponding to the direction in which the user should proceed on the actual golf course in order to arrive at the geospatial position corresponding to the simulated ball position. Other outputs in addition to, or alternative to, the arrow 3005 may also be included in the interface 3000 to assist the user in proceeding to the simulated ball position. For example, continuous numerical updates may be output on the interface 3000 indicating a relative numerical distance and direction of the terminal device 100 with respect to the geospatial position corresponding to the simulated ball location.

Obviously, numerous modifications and variations of the present disclosure are possible in light of the above teachings. It is therefore to be understood that within the scope of the appended claims, the invention may be practiced otherwise than as specifically described herein. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable processing circuits configured to execute program code and/or computer instructions to execute the functions, processes and algorithms described herein. A processing circuit includes a programmed processor, as a processor includes circuitry. A processing circuit also includes devices such as an application specific integrated circuit (ASIC) and conventional circuit components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)).

The network may be a private network, such as a LAN or WAN, or may be a public network, such as the Internet. Input to the system may be received via direct user input and/or received remotely either in real-time or as a batch process. Additionally, some implementations may be performed on modules or hardware not identical to those described. Accordingly, other implementations are within the scope that may be claimed.

Aspects of the present disclosure may also be adapted to other sports and activities.

It must be noted that, as used in the specification and the appended claims, the singular forms "a," "an," and "the" include plural referents unless the context clearly dictates otherwise.

The above disclosure also encompasses the embodiments noted below.

(1) A device comprising circuitry configured to: receive, from a position sensor, a geospatial position of the device; receive, from a memory, image data corresponding to one or more golf courses, wherein the image data is received when the circuitry determines that the geospatial position of the device corresponds to a current golf course, of the one or more golf courses; control a display such that the image data corresponding to the current golf course is output on the display; receive a simulated shot input representing a simulated golf stroke taken at the geospatial location of the device; calculate a simulated shot trajectory based on the simulated shot input; and control the display to output a result of the simulated golf stroke.

(2) The device of (1), wherein the circuitry is configured to receive scoring data representing physical golf shots performed on the current golf course.

(3) The device of (1) or (2), wherein the scoring data is generated in a same round of golf as the simulated golf stroke.

(4) The device of any one of (1) to (3), wherein the circuitry is configured to generate simulated scoring data corresponding to the simulated golf stroke.

(5) The device of any one of (1) to (4), wherein the circuitry is configured to generate a hybrid score based on a combination of the received scoring data and the simulated scoring data.

(6) The device of any one of (1) to (5), wherein the simulated shot input is generated based on motion data output from one or more motion sensors.

(7) The device of any one of (1) to (6), wherein the motion data is generated by the one or more motion sensors in response to a physical motion corresponding to the simulated golf stroke.

(8) The device of any one of (1) to (7), wherein the circuitry is further configured to calculate the simulated shot trajectory based on the motion data, and the simulated shot trajectory includes a direction and a distance of the simulated golf stroke.

(9) The device of any one of (1) to (8), wherein the circuitry is configured to receive a club selection input indicating a simulated club for performing the simulated golf stroke.

(10) The device of any one of (1) to (9), wherein the circuitry is further configured to calculate the simulated shot trajectory based on the club selection input.

(11) The device of any one of (1) to (10), wherein the circuitry is configured to control the display to output an indication of an endpoint of the simulated shot trajectory.

(12) The device of any one of (1) to (11), wherein the endpoint of the simulated shot trajectory represents a final resting position of a simulated ball on the current golf course following the simulated golf stroke.

(13) The device of any one of (1) to (12), wherein the circuitry is configured to determine geospatial coordinates that correspond to display coordinates of the simulated ball's final resting position.

(14) The device of any one of (1) to (13), wherein the circuitry is configured to determine at least one of a direction and a distance of the geospatial coordinates with respect to the geospatial position of the device.

(15) The device of any one of (1) to (14), wherein the circuitry is configured to control the display such that the display outputs a graphical indication providing guidance for traveling from the geospatial position of the device to the geospatial coordinates corresponding to display coordinates of the simulated ball's final resting position.

(16) The device of any one of (1) to (15), wherein the circuitry is configured to: receive an updated geospatial position of the device when the position sensor determines that the geospatial position of the device changes; determine when the updated geospatial position of the device is within a predetermined threshold range of the geospatial coordinates corresponding to display coordinates of the simulated ball's final resting position; and control the display to output an indication that the device is within the predetermined threshold range.

(17) The device of any one of (1) to (16), further comprising one or more environmental sensors that determine environmental conditions relative to the device, wherein the circuitry is further configured to calculate the simulated shot trajectory based on the environmental conditions.

(18) The device of any one of (1) to (17), wherein the circuitry is configured to control the display to output a prompt, following the simulated golf stroke, wherein the prompt includes an inquiry as to whether a next shot will be simulated or performed with an actual golf club.

(19) A method comprising: receiving, from a position sensor included in a terminal device, a geospatial position of the terminal device; receiving, from a memory, image data corresponding to one or more golf courses, wherein the image data is received when the circuitry determines that the geospatial position of the terminal device corresponds to a current golf course, of the one or more golf courses; controlling, by circuitry, a display such that the image data corresponding to the current golf course is output on the display; receiving, by the circuitry, a simulated shot input representing a simulated golf stroke taken at the geospatial location of the terminal device; calculating, by the circuitry, a simulated shot trajectory based on the simulated shot input; and controlling, by the circuitry, the display to output a result of the simulated golf stroke.

(20) A non-transitory computer readable medium having instructions stored therein that when executed by one or more processors, cause a terminal device to perform a method comprising: receiving, from a position sensor included in the terminal device, a geospatial position of the terminal device; receiving, from a memory, image data corresponding to one or more golf courses, wherein the image data is received when the circuitry determines that the geospatial position of the terminal device corresponds to a current golf course, of the one or more golf courses; controlling a display such that the image data corresponding to the current golf course is output on the display; receiving a simulated shot input representing a simulated golf stroke taken at the geospatial location of the terminal device; calculating a simulated shot trajectory based on the simulated shot input; and controlling the display to output a result of the simulated golf stroke.

The invention claimed is:

1. A device comprising
circuitry configured to:
   determine, based on an output of a position sensor, a geospatial position of the device;
   receive, from a memory, image data corresponding to one or more golf courses, wherein the image data is received when the circuitry determines that the geospatial position of the device corresponds to a current golf course, of the one or more golf courses;
   control a display such that the image data corresponding to the current golf course is output on the display;
   receive a simulated shot input representing a simulated golf stroke taken at the geospatial location of the device;
   calculate a simulated shot trajectory based on the simulated shot input;
   control the display to output a result of the simulated golf stroke;
   receive scoring data representing physical golf shots performed on the current golf course; and
   generate simulated scoring data corresponding to the simulated golf stroke.

2. The device of claim 1, wherein
the circuitry is configured to generate a hybrid score based on a combination of the received scoring data and the simulated scoring data.

3. The device of claim 1, wherein
the simulated shot input is generated based on motion data output from one or more motion sensors.

4. The device of claim 3, wherein
the motion data is generated by the one or more motion sensors in response to a physical motion corresponding to the simulated golf stroke.

5. The device of claim 4, wherein
the circuitry is further configured to calculate the simulated shot trajectory based on the motion data, and
the simulated shot trajectory includes a direction and a distance of the simulated golf stroke.

6. The device of claim 1, wherein
the circuitry is configured to receive a club selection input indicating a simulated club for performing the simulated golf stroke.

7. The device of claim 6, wherein
the circuitry is further configured to calculate the simulated shot trajectory based on the club selection input.

8. The device of claim 1, wherein
the circuitry is configured to control the display to output an indication of an endpoint of the simulated shot trajectory.

9. The device of claim 8, wherein
the endpoint of the simulated shot trajectory represents a final resting position of a simulated ball on the current golf course following the simulated golf stroke.

10. The device of claim 9, wherein
the circuitry is configured to determine geospatial coordinates that correspond to display coordinates of the simulated ball's final resting position.

11. The device of claim 10, wherein
the circuitry is configured to determine at least one of a direction and a distance of the geospatial coordinates with respect to the geospatial position of the device.

12. The device of claim 10, wherein
the circuitry is configured to control the display such that the display outputs a graphical indication providing guidance for traveling from the geospatial position of the device to the geospatial coordinates corresponding to coordinates of the simulated ball's final resting position.

13. The device of claim 1, further comprising
one or more environmental sensors that determine environmental conditions relative to the device, wherein
the circuitry is further configured to calculate the simulated shot trajectory based on the environmental conditions.

14. The device of claim 1, wherein
the circuitry is configured to control the display to output a prompt, following the simulated golf stroke, wherein the prompt includes an inquiry as to whether a next shot will be simulated or performed with an actual golf club.

15. A device comprising:
circuitry is configured to:
   determine, based on an output of a position sensor, a geospatial position of the device;
   receive, from a memory, image data corresponding to one or more golf courses, wherein the image data is received when the circuitry determines that the geospatial position of the device corresponds to a current golf course, of the one or more golf courses;
   control a display such that the image data corresponding to the current golf course is output on the display;
   receive a simulated shot input representing a simulated golf stroke taken at the geospatial location of the device;
   calculate a simulated shot trajectory based on the simulated shot input;
   control the display to output an indication of an endpoint of the simulated shot trajectory representing a final resting position of a simulated ball on the current golf course following the simulated golf stroke;
   determine geospatial coordinates that correspond to display coordinates of the simulated ball's final resting position;
   control the display to output a graphical indication providing guidance for traveling from the geospatial position of the device to the geospatial coordinates corresponding to coordinates of the simulated ball's final resting position;
   receive an updated geospatial position of the device when the position sensor determines that the geospatial position of the device changes;
   determine when the updated geospatial position of the device is within a predetermined threshold range of the geospatial coordinates corresponding to display coordinates of the simulated ball's final resting position; and
   control the display to output an indication that the device is within the predetermined threshold range.

16. A method comprising:
determining, based on an output of a position sensor included in a terminal device, a geospatial position of the terminal device;
receiving, from a memory, image data corresponding to one or more golf courses, wherein the image data is received when the circuitry determines that the geospatial position of the terminal device corresponds to a current golf course, of the one or more golf courses;
controlling, by circuitry, a display such that the image data corresponding to the current golf course is output on the display;

receiving, by the circuitry, a simulated shot input representing a simulated golf stroke taken at the geospatial location of the terminal device;
calculating, by the circuitry, a simulated shot trajectory based on the simulated shot input;
controlling, by the circuitry, the display to output a result of the simulated golf stroke;
receiving scoring data representing physical golf shots performed on the current golf course; and
generating simulated scoring data corresponding to the simulated golf stroke.

17. A non-transitory computer readable medium having instructions stored therein that when executed by one or more processors, cause a terminal device to perform a method comprising:
   determining, based on an output of a position sensor included in the terminal device, a geospatial position of the terminal device;
   receiving, from a memory, image data corresponding to one or more golf courses, wherein the image data is received when the circuitry determines that the geospatial position of the terminal device corresponds to a current golf course, of the one or more golf courses;
   controlling a display such that the image data corresponding to the current golf course is output on the display;
   receiving a simulated shot input representing a simulated golf stroke taken at the geospatial location of the terminal device;
   calculating a simulated shot trajectory based on the simulated shot input;
   controlling the display to output a result of the simulated golf stroke;
   receiving scoring data representing physical golf shots performed on the current golf course; and
   generating simulated scoring data corresponding to the simulated golf stroke.

18. A device comprising
circuitry configured to:
   determine, based on an output of a position sensor, a geospatial position of the device;
   receive, from a memory, image data corresponding to one or more golf courses when the circuitry determines that the geospatial position of the device corresponds to a current golf course, of the one or more golf courses;
   control a display to display the image data corresponding to the current golf course;
   receive an input corresponding to a simulated shot input representing a simulated golf stroke taken at the geospatial location of the device;
   calculate a simulated shot trajectory based on the simulated shot input;
   control the display to output a result of the simulated golf stroke;
   generate simulated scoring data corresponding to the simulated golf stroke;
   receive scoring data representing physical golf shots performed on the current golf course; and
   generate a hybrid score based on a combination of the received scoring data and the simulated scoring data.

\* \* \* \* \*